(12) United States Patent
Brochu et al.

(10) Patent No.: US 12,373,498 B2
(45) Date of Patent: Jul. 29, 2025

(54) PROVIDING DATA VISUALIZATIONS BASED ON PERSONALIZED RECOMMENDATIONS

(71) Applicant: Tableau Software, LLC, Seattle, WA (US)

(72) Inventors: Eric Roy Brochu, Vancouver (CA); Mya Rose Warren, Vancouver (CA); Yogesh Sood, Vancouver (CA); David John Mosimann, New Westminster (CA); Connie Hong-Ying Wong, Vancouver (CA); Kazem Jahanbakhsh, Vancouver (CA)

(73) Assignee: Tableau Software, LLC, Seattle, WA (US)

(*) Notice: Subject to any disclaimer, the term of this patent is extended or adjusted under 35 U.S.C. 154(b) by 188 days.

(21) Appl. No.: 16/672,130

(22) Filed: Nov. 1, 2019

(65) Prior Publication Data

US 2021/0133239 A1    May 6, 2021

(51) Int. Cl.
*G06F 16/904* (2019.01)
*G06F 11/34* (2006.01)
(Continued)

(52) U.S. Cl.
CPC ........ *G06F 16/904* (2019.01); *G06F 11/3438* (2013.01); *G06N 5/04* (2013.01); *G06N 20/00* (2019.01)

(58) Field of Classification Search
CPC ... G06F 16/904; G06F 11/3438; G06N 20/00; G06N 5/04
See application file for complete search history.

(56) References Cited

U.S. PATENT DOCUMENTS 7,010,364 B1   3/2006  Singh et al.
8,099,674 B2   1/2012  Mackinlay et al.
(Continued)

FOREIGN PATENT DOCUMENTS

JP   2007249354 A   9/2007
JP   2008217480 A   9/2008
(Continued)

OTHER PUBLICATIONS

Office Communication for U.S. Appl. No. 16/732,027 mailed Jun. 14, 2021, pp. 1-22.
(Continued)

*Primary Examiner* — Courtney Harmon
(74) *Attorney, Agent, or Firm* — Morgan, Lewis & Bockius LLP

(57) ABSTRACT

Embodiments are directed to managing visualizations of data. Visualization models and a user profile may be provided such that the visualization models and the user profile may be associated with an organization. A complexity score for the organization may be provided based on one or more characteristics of the organization. A recommendation model may be provided based on the complexity score and a baseline model. The recommendation model may be employed to determine one or more recommended visualization models based on the user profile such that the recommendation model associates each recommended visualization model with a confidence score. The one or more recommended visualization models may be rank ordered based on each associated confidence score. A report that includes a rank ordered list of the one or more recommended visualization models may be provided to a user associated with the user profile.

24 Claims, 9 Drawing Sheets

(51) Int. Cl.
*G06N 5/04* (2023.01)
*G06N 20/00* (2019.01)

(56) References Cited

U.S. PATENT DOCUMENTS

| | | | |
|---|---|---|---|
| 8,589,811 B2 | 11/2013 | Gotz | |
| 8,983,994 B2 | 3/2015 | Neels et al. | |
| 9,335,911 B1 | 5/2016 | Elliot et al. | |
| 9,361,320 B1 | 6/2016 | Vijendra et al. | |
| 9,418,105 B2 | 8/2016 | Buchheit et al. | |
| 9,613,086 B1 | 4/2017 | Sherman | |
| 9,779,147 B1 | 10/2017 | Sherman et al. | |
| 10,460,332 B1 | 10/2019 | Kujat et al. | |
| 10,552,513 B1 | 2/2020 | Harkare | |
| 10,572,544 B1 | 2/2020 | Zhang et al. | |
| 10,572,804 B1 | 2/2020 | Hilley | |
| 10,572,859 B1 | 2/2020 | Evans et al. | |
| 10,572,925 B1 | 2/2020 | Roy Chowdhury et al. | |
| 10,592,525 B1 | 3/2020 | Khante et al. | |
| 10,642,723 B1 | 5/2020 | Krishnamoorthy | |
| 10,705,695 B1 | 7/2020 | Porath et al. | |
| 10,719,332 B1 | 7/2020 | Dwivedi et al. | |
| 10,775,976 B1 | 9/2020 | Abdul-Jawad et al. | |
| 10,929,415 B1 | 2/2021 | Shcherbakov et al. | |
| 10,963,347 B1 | 3/2021 | Chen et al. | |
| 11,074,301 B2 | 7/2021 | Williams et al. | |
| 11,232,506 B1 | 1/2022 | Zielnicki | |
| 2005/0134589 A1 | 6/2005 | Heer et al. | |
| 2007/0136285 A1 | 6/2007 | Cormode et al. | |
| 2008/0168135 A1 | 7/2008 | Redlich et al. | |
| 2009/0105984 A1 | 4/2009 | Wen et al. | |
| 2011/0137850 A1 | 6/2011 | Mourey et al. | |
| 2011/0296309 A1 | 12/2011 | Ngan | |
| 2011/0302110 A1 | 12/2011 | Beers et al. | |
| 2012/0229466 A1 | 9/2012 | Richie et al. | |
| 2012/0233182 A1 | 9/2012 | Baudel et al. | |
| 2013/0091465 A1 | 4/2013 | Kikin-Gil et al. | |
| 2013/0103677 A1 | 4/2013 | Chakra et al. | |
| 2013/0204894 A1 | 8/2013 | Faith et al. | |
| 2013/0300463 A1 | 11/2013 | Gemmeke et al. | |
| 2014/0019443 A1 | 1/2014 | Golshan | |
| 2014/0032548 A1 | 1/2014 | Gilra et al. | |
| 2014/0059017 A1 | 2/2014 | Chaney et al. | |
| 2014/0074889 A1 | 3/2014 | Neels et al. | |
| 2014/0156223 A1 | 6/2014 | Toomre et al. | |
| 2014/0344008 A1 | 11/2014 | Gammage et al. | |
| 2015/0112894 A1 | 4/2015 | Lingappa | |
| 2015/0278214 A1 | 10/2015 | Anand et al. | |
| 2016/0034305 A1 | 2/2016 | Shear et al. | |
| 2016/0092408 A1 | 3/2016 | Lagerblad et al. | |
| 2016/0092576 A1* | 3/2016 | Quercia | G06F 16/9535 707/722 |
| 2016/0103908 A1 | 4/2016 | Fletcher et al. | |
| 2016/0196534 A1* | 7/2016 | Jarrett | G06Q 50/2057 705/321 |
| 2016/0307210 A1* | 10/2016 | Agarwal | G06Q 10/06316 |
| 2016/0307233 A1 | 10/2016 | Pan et al. | |
| 2016/0350950 A1 | 12/2016 | Ritchie et al. | |
| 2016/0357829 A1 | 12/2016 | Fung et al. | |
| 2016/0364770 A1 | 12/2016 | Denton et al. | |
| 2017/0031449 A1* | 2/2017 | Karsten | G06F 1/163 |
| 2017/0061659 A1* | 3/2017 | Puri | G06F 16/23 |
| 2017/0069118 A1 | 3/2017 | Stewart | |
| 2017/0124617 A1 | 5/2017 | Spoelstra et al. | |
| 2017/0132489 A1 | 5/2017 | Simgi | |
| 2017/0140118 A1 | 5/2017 | Haddad et al. | |
| 2017/0154088 A1 | 6/2017 | Sherman | |
| 2017/0154089 A1 | 6/2017 | Sherman | |
| 2017/0220633 A1 | 8/2017 | Porath et al. | |
| 2017/0308913 A1* | 10/2017 | Chao | G06Q 30/0202 |
| 2018/0004363 A1 | 1/2018 | Tompkins | |
| 2018/0032492 A1 | 2/2018 | Altshuller et al. | |
| 2018/0039399 A1 | 2/2018 | Kaltegaertner et al. | |
| 2018/0121035 A1 | 5/2018 | Filippi et al. | |
| 2018/0129369 A1 | 5/2018 | Kim et al. | |
| 2018/0210936 A1 | 7/2018 | Reynolds et al. | |
| 2018/0232405 A1 | 8/2018 | Samara et al. | |
| 2018/0267676 A1 | 9/2018 | Glueck et al. | |
| 2018/0285772 A1 | 10/2018 | Gopalan | |
| 2018/0288087 A1* | 10/2018 | Hittel | H04L 63/145 |
| 2018/0343321 A1 | 11/2018 | Chang | |
| 2019/0012553 A1 | 1/2019 | Maruchi et al. | |
| 2019/0026681 A1* | 1/2019 | Polli | G09B 7/02 |
| 2019/0043506 A1* | 2/2019 | Rivkin | G06N 5/003 |
| 2019/0102425 A1 | 4/2019 | Obeidat | |
| 2019/0108272 A1 | 4/2019 | Talbot et al. | |
| 2019/0129964 A1 | 5/2019 | Corbin, II et al. | |
| 2019/0130512 A1* | 5/2019 | Kuhn | H04L 67/00 |
| 2019/0179621 A1 | 6/2019 | Salgado et al. | |
| 2019/0188333 A1 | 6/2019 | Williams et al. | |
| 2019/0213608 A1 | 7/2019 | Ouyang et al. | |
| 2019/0339688 A1 | 11/2019 | Cella et al. | |
| 2019/0355447 A1 | 11/2019 | Barkol et al. | |
| 2020/0012939 A1 | 1/2020 | Hu et al. | |
| 2020/0019546 A1 | 1/2020 | Luo et al. | |
| 2020/0050636 A1 | 2/2020 | Datla et al. | |
| 2020/0066397 A1* | 2/2020 | Rai | G06Q 10/067 |
| 2020/0104731 A1 | 4/2020 | Oliner et al. | |
| 2020/0134545 A1 | 4/2020 | Appel et al. | |
| 2020/0211692 A1* | 7/2020 | Kalafut | G06F 40/30 |
| 2020/0233559 A1 | 7/2020 | Rueter et al. | |
| 2020/0250472 A1 | 8/2020 | Abhyankar et al. | |
| 2020/0250562 A1 | 8/2020 | Bly | |
| 2020/0311680 A1 | 10/2020 | Wahl et al. | |
| 2020/0320462 A1* | 10/2020 | Wang | G06N 3/045 |
| 2020/0333777 A1 | 10/2020 | Maruyama | |
| 2020/0372472 A1 | 11/2020 | Kenthapadi et al. | |
| 2020/0403944 A1 | 12/2020 | Joshi et al. | |
| 2020/0410001 A1 | 12/2020 | Sarkissian | |
| 2021/0011961 A1 | 1/2021 | Guan et al. | |
| 2021/0019338 A1 | 1/2021 | Grampurohit et al. | |
| 2021/0019357 A1 | 1/2021 | Bennett et al. | |
| 2021/0049143 A1 | 2/2021 | Jacinto et al. | |
| 2021/0081377 A1 | 3/2021 | Polleri et al. | |
| 2021/0088418 A1 | 3/2021 | Sato et al. | |
| 2021/0110288 A1 | 4/2021 | Poothiyot et al. | |
| 2021/0133632 A1 | 5/2021 | Elprin et al. | |
| 2021/0194783 A1 | 6/2021 | Sinha et al. | |
| 2021/0313070 A1 | 10/2021 | Toyoshiba et al. | |
| 2021/0365856 A1 | 11/2021 | Mukherjee et al. | |
| 2022/0019947 A1 | 1/2022 | Mitelman | |
| 2022/0147540 A1 | 5/2022 | Rossi et al. | |
| 2022/0317979 A1* | 10/2022 | Araujo Soares | G06F 8/33 |

FOREIGN PATENT DOCUMENTS

| | | |
|---|---|---|
| JP | 2009-534752 A | 9/2009 |
| JP | 2017174176 A | 9/2017 |
| JP | 2021-6991 A | 1/2021 |
| WO | 2014010071 A1 | 1/2014 |
| WO | 2015030214 A1 | 3/2015 |

OTHER PUBLICATIONS

Office Communication for U.S. Appl. No. 16/915,963 mailed Jul. 19, 2021, pp. 1-9.
Arai, Taichi et al., "Preventing the creation of misleading graphs, Targeted learning tool," IPSJ SIG Technical Report [online], Mar. 12, 2018, vol. 2018-GN-104 No. 4, ISSN 2188-8744, pp. 1-17.
Barowy, Daniel W. et al., "ExceLint: Automatically Finding Spreadsheet Formula Errors," In Proceedings of the ACM Programming Languages 2, OOPSLA, 2018, Article 148, pp. 1-26.
Barowy, Daniel W. et al., "CheckCell: Data Debugging for Spreadsheets," ACM SIGPLAN Notices, 2014, vol. 49, Iss. 10, pp. 507-523.
Donaldson, Alastair F. et al., "Automated Testing of Graphics Shader Compilers," In Proceedings of the ACM Programming Languages 1, OOPSLA, 2017, Article 93, pp. 1-29.
Dragicevic, Pierre et al., "Increasing the Transparency of Research Papers with Explorable Multiverse Analyses," In Proceedings of The ACM CHI Conference on Human Factors in Computing Systems, 2019, Glasgow, United Kingdom, pp. 1-16.

(56) References Cited

OTHER PUBLICATIONS

Gotz, David et al., "Visualization Model Validation via Inline Replication," Information Visualization, 2019, pp. 405-425.
Guderlei, Ralph et al., "Statistical Metamorphic Testing—Testing Programs With Random Output by Means of Statistical Hypothesis Tests and Metaphoric Testing," In Seventh International Conference on Quality Software, IEEE, 2007, pp. 404-409.
Guo, Yue et al., "What You See is Not What You Get!: Detecting Simpson's Paradoxes During Data Exploration," In ACM SIGMOD Workshop on Human-in-the-Loop Data Analytics (HILDA), 2017, Article 2, pp. 1-5.
Hynes, Nick et al., "The Data Linter: Lightweight, Automated Sanity Checking for ML Data Sets," In NIPS: Workshop on Systems for ML and Open Source Software, 2017, pp. 1-7.
Kindlmann, Gordon et al., "An Algebraic Process for Visualization Design," IEEE Transactions on Visualization and Computer Graphics, 2014, vol. 20, No. 12, pp. 2181-2190.
Kirby, Robert M. et al., "The Need for Verifiable Visualization," IEEE Computer Graphics and Applications, 2008, vol. 28, No. 5, pp. 78-83.
McNutt, Andrew et al., "Linting for Visualization: Towards a Practical Automated Visualization Guidance System," In VisGuides: 2nd Workshop on the Creation, Curation, Critique and Conditioning of Principles and Guidelines in Visualization, 2018, pp. 1-14.
Muşlu, Kivanç et al., "Preventing Data Errors with Continuous Testing," In Proceedings of the 2015 International Symposium on Software Testing and Analysis, ACM, 2015, pp. 373-384.
Salimi, Babak et al., "Bias in OLAP Queries: Detection, Explanation, and Removal." In Proceedings of the 2018 International Conference on Management of Data, ACM, 2018, pp. 1021-1035.
Tang, Nan et al., "Towards Democratizing Relational Data Visualization," In Proceedings of the 2019 International Conference on Management of Data, ACM, 2019, pp. 2025-2030.
Wall, Emily et al., "Warning, Bias May Occur: A Proposed Approach to Detecting Cognitive Bias in Interactive Visual Analytics," In 2017 IEEE Conference on Visual Analytics Science and Technology (VAST), IEEE, 2017, pp. 104-115.
Wickham, Hadley et al., "Graphical Inference for Infovis," IEEE Transactions on Visualization and Computer Graphics 16, 2010, pp. 973-979.
Anand, Anushka et al., "Automatic Selection of Partitioning Variables for Small Mulitiple Displays," IEEE Transactions on Visualization and Computer Graphics, 2015, vol. 22, Iss. 1, pp. 669-677.
Anonymous, "Glitchart: When charts attack," https://glitch-chart.tumblr.com/, 2019, Accessed Feb. 5, 2020, pp. 1-1.
Armstrong, Zan et al., "Visualizing Statistical Mix Effects and Simpson's Paradox," IEEE Transactions on Visualization and Computer Graphics, 2014, vol. 20, No. 12, pp. 2132-2141.
Barr, Earl T. et al., "The Oracle Problem in Software Testing: A Survey," IEEE Transactions on Software Engineering, 2015, vol. 41, No. 5, pp. 507-525.
Binnig, Carsten et al., "Toward Sustainable Insights, or Why Polygamy is Bad for You," In Proceedings of the 8th Biennial Conference on Innovative Data Systems Research, 2017, pp. 1-7.
Borland, David et al., "Contextual Visualization," IEEE Computer Graphics and Applications, 2018, vol. 38, No. 6, pp. 17-23.
Bresciani, Sabrina et al., "The Risks of Visualization," Identität und Vielfalt der Kommunikations-wissenschaft, 2009, pp. 1-22.
Bresciani, Sabrina et al., "The Pitfalls of Visual Representations: A Review and Classification of Common Errors Made While Designing and Interpreting Visualizations," SAGE Open, 2015, pp. 1-14.
Cairo, Alberto, "Graphic Lies, Misleading Visuals," In New Challenges for Data Design, Springer, 2015, pp. 103-116.
Chi, Ed Huai-Hsin, "A Taxonomy of Visualization Techniques Using the Data State Reference Model," In IEEE Symposium on Information Visualizations, 2000, pp. 69-75.
Chiw, Charisee et al., "DATm: Diderot's Automated Testing Model," In IEEE/ACM 12th International Workshop on Automation of Software Testing (AST), IEEE, 2017, pp. 45-51.
Cleveland, William S. et al., "Variables on Scatterplots Look More Highly Correlated When the Scales are Increased," Science, 1982, vol. 216, No. 4550, pp. 1138-1141.
Cockburn, Andy et al., "Hark No More: On the Preregistration of CHI Experiments," In Proceedings of the 2018 CHI Conference on Human Factors in Computing Systems, ACM, 2018, pp. 1-12.
Correll, Michael, "Ethical Dimensions of Visualization Research," In Proceedings of the 2019 CHI Conference on Human Factors In Computing Systems, ACM, 2019, pp. 1-13.
Correll, Michael et al., "Truncating the Y-Axis: Threat or Menace?," arXiv preprint arXiv:1907.02035, 2019. pp. 1-12.
Correll, Michael et al., "Surprise! Bayesian Weighting for De-Blasing Thematic Maps," IEEE Transactions on Visualization and Computer Graphics, 2016, pp. 1-10.
Correll, Michael et al., "Black Hat Visualization," In IEEE VIS; Workshop on Dealing With Cognitive Biases in Visualizations, 2017, pp. 1-4.
Correll, Michael et al., "Looks Good To Me: Visualizations As Sanity Checks," IEEE Transactions on Visualizations and Computer Graphics, 2018, pp. 1-10.
Diehl, Alexandra et al., "VisGuides: A Forum for Discussing Visualization Guidelines," In Proceedings of the Eurographics/IEEE VGTC Conference on Visualization: Short Papers, Eurographics Asscociation, 2018, pp. 61-65.
D'Ignazio, Catherine et al., "Feminist Data Visualization," In IEEE VIS: Workshop on Visualization for the Digital Humanities (VIS4DH), 2016, pp. 1-5.
Dimara, Evanthia et al., "A Task-Based Taxonomy of Cognitive Biases for Information Visualization," IEEE Transactions on Visualization and Computer Graphics, 2018, pp. 1-21.
Dörk, Marian et al., "Critical InfoVis: Exploring the Politics of Visualization," In 2013 ACM SIGCHI Conference on Human Factors in Computing Systems, Extended Abstracts, 2013, pp. 2189-2198.
Efron, Bradley, "Bootstrap Methods: Another Look at the Jackknife," The Annals of Statistics, 1979, vol. 7, No. 1, pp. 1-26.
Filipov, Velitchko et al., "CV3: Visual Exploration, Assessment, and Comparison of CVs," In Computer Graphics Forum, Wiley Online Library, 2019, pp. 107-118.
Ford, Brian, "Write-Good: Naive Linter for English Prose," https://github.com/btford/write-good Accessed: Feb. 6, 2020, pp. 1-6.
Gelman, Andrew et al., "The garden of forking paths: Why multiple comparisons can be a problem, even when there is no "fishing expedition" or "p-hacking" and the research hypothesis was posited ahead of time," Department of Statistics, Columbia University, 2013, pp. 1-17.
World Bank Group, "World Development Indicators," http://datatopics.worldbank.org/world-development-indicators/, 2020, pp. 1-6.
Haraway, Donna, "Situated Knowledges: The Science Question in Feminism and the Privilege of Partial Perspective," Feminist Studies, 1988, vol. 14, No. 3, pp. 575-599.
Heer, Jeffrey, "Agency plus automation: Designing artificial intelligence into interactive systems," In Proceedings of the National Academy of Sciences, 2019, vol. 116, No. 6, pp. 1844-1850.
Heer, Jeffrey, "Visualization is Not Enough," https://homes.cs.washington.edu/~jheer/talks/EuroVis2019-Capstone.pdf EuroVis Capstone, 2019, pp. 1-113.
Heer, Jeffrey et al., "Multi-Scale Banking to 45 Degrees," IEEE Transactions on Visualization and Computer Graphics, 2006, vol. 12, No. 5, pp. 701-708.
Hibbard, William L. et al., "A Lattice Model for Data Display," In Proceedings of the Conference on Visualization, IEEE Computer Society Press, 1994, pp. 310-317.
Hofmann, Heike et al., "Graphical Tests for Power Comparison of Competing Designs," IEEE Transactions on Visualization and Computer Graphics, 2012, vol. 18, No. 12, pp. 2441-2448.
Huff, Darrell, "How To Lie With Statistics," WW Norton & Company, 31st Printing, 1993, pp. 1-141.
Hullman, Jessica et al., "Visualization Rhetoric: Framing Effects in Narrative Visualization," IEEE Transaction on Visualization and Computer Graphics, 2011, vol. 17, No. 12, pp. 2231-2240.

(56) References Cited

OTHER PUBLICATIONS

Isenberg, Tobias et al., "A Systematic Review on the Practice of Evaluating Visualization," IEEE Transactions on Visualization and Computer Graphics, 2013, vol. 19, No. 12, pp. 2818-2827.
Jannah, Hassan M., "MetaReader: A Dataset Meta-Exploration and Documentation Tool," 2014, pp. 1-11.
Johnson, Stephen C., "Lint, a C Program Checker," Citeseer, 1977, pp. 1-12.
Kandel, Sean et al., "Research directions in data wrangling: Visualizations and transformations for usable and credible data," Information Visualization, 2011, vol. 10, No. 4, pp. 271-288.
Kandel, Sean et al., "Profiler: Integrated Statistical Analysis and Visualization for Data Quality Assessment," In Proceedings of the International Working Conference on Advanced Visual Interfaces, ACM, 2012, pp. 547-554.
Kim, Won et al., "A Taxonomy of Dirty Data," Data Mining and Knowledge Discovery, 2003, vol. 7, No. 1, pp. 81-89.
Kindlmann, Gordon et al., "Algebraic Visualization Design for Pedagogy," IEEE VIS: Workshop on Pedagogy of Data Visualization, 2016, pp. 1-5.
Kong, Ha-Kyung et al., "Frames and Slants in Titles of Visualizations on Controversial Topics," In Proceedings of the 2018 CHI Conference on Human Factors in Computing Systems, ACM, 2018, pp. 1-12.
Kong, Ha-Kyung et al., "Trust and Recall of Information across Varying Degrees of Title-Visualization Misalignment," In Proceedings of the 2019 CHI Conference on Human Factors In Computing Systems, ACM, 2019, 346, pp. 1-13.
Amperser Labs, "Proselint: A linter for prose," http://proselint.com/, Accessed: Feb 10, 2020, pp. 1-3.
Lavigne, Sam et al., "Predicting Financial Crime: Augmenting the Predictive Policing Arsenal," arXiv preprint arXiv:1704.07826, 2017, pp. 1-8.
Ziemkiewicz, Caroline et al., "Embedding Information Visualization Within Visual Representation," In Advances in Information and Intelligent Systems, Springer, 2009, pp. 1-20.
Zhou, Zhi Quan et al., "Metamorphic Testing of Driverless Cars," Communications of the ACM, 2019, vol. 62, No. 3, pp. 61-67.
Zhao, Zheguang et al., "Controlling False Discoveries During Interactive Data Exploration," In proceedings of the 2017 International Conference on Management of Data, ACM, 2016, pp. 527-540.
Lundgard, Alan et al., "Sociotechnical Considerations for Accessible Visualization Design," IEEE Transactions on Visualization and Computer Graphics, 2019, pp. 1-5.
Lunzer, Aran et al., "It Ain't Necessarily So: Checking Charts for Robustness," IEEE VisWeek Poster Proceedings, 2014, pp. 1-3.
Lupi, Giorgia, "Data Humanism: The Revolutionary Future of Data Visualization," Print Magazine 30, 2017, pp. 1-10.
MacKinlay, Jock et al., "Show Me: Automatic Presentation for Visual Analysis," IEEE Transactions on Visualization and Computer Graphics, 2007, vol. 13, No. 6, pp. 1137-1144.
Matejka, Justin et al., "Same Stats, Different Graphs: Generating Datasets with Varied Appearance and Identical Statistics Through Simulated Annealing," In Proceedings of the 2017 CHI Conference on Human Factors in Computing Systems, ACM, 2017, pp. 1290-1294.
Mayorga, Adrian et al., "Splatterplots: Overcoming Overdraw in Scatter Plots," IEEE Transactions on Visualization and Computer Graphics, 2013, vol. 19, No. 9, pp. 1526-1538.
Mayr, Eva et al., "Trust in Information Visualization," In EuroVis Workshop on Trustworthy Visualization (TrustVis), Robert Kosara, Kal Lawonn, Lars Linsenm, and Noeska Smit (Eds.), The Eurographics Association, 2019, pp. 1-5.
Micallef, Luana et al., "Towards Perceptual Optimization of the Visual Design of Scatterplots," IEEE Transactions on Visualization and Computer Graphics, 2017, vol. 23, No. 6, pp. 1-12.
Moere, Andrew Vande, "Towards Designing Persuasive Ambient Visualization," In Issues in the Design & Evaluation of Ambient Information Systems Workshop, Citeseer, 2007, pp. 48-52.
Moritz, Dominik et al., "Formalizing Visualization Design Knowledge as Constraints: Actionable and Extensible Models in Draco," IEEE Transactions on Visualization and Computer Graphics, 2018, vol. 25, No. 1, pp. 438-448.
Newman, George E. et al., "Bar graphs depicting averages are perceptually misinterpreted: The within-the-bar bias," Psychonomic Bulletin & Review, 2012, vol. 19, No. 4, pp. 601-607.
Onuoha, Mimi, "On Missing Data Sets," https://github.com/mimionuoha/missing-datasets, Accessed: Feb. 10, 2020, pp. 1-3.
Pandey, Anshul Vikram et al., "How Deceptive are Deceptive Visualizations?: An Empirical Analysis of Common Distortion Techniques," In Proceedings of the 33rd Annual ACM Conference on Human Factors in Computing Systems, ACM, 2015, pp. 1469-1478.
Pirolli, Peter et al., "The Sensemaking Process and Leverage Points for Analyst Technology as Identified Through Cognitive Task Analysis," In Proceedings of International Conference on Intelligence Analysis, 2005, vol. 5, pp. 1-6.
Plaisant, Catherine, "Information Visualization and the Challenge of Universal Usability," In Exploring Geovisualization, Elsevier, 2005, pp. 1-19.
Pu, Xiaoying et al., "The Garden of Forking Paths in Visualization: A Design Space for Reliable Exploratory Visual Analyics: Position Paper," In IEEE VIS: Evaluation and Beyond-Methodological Approaches for Visualization (BELIV), IEEE, 2018, pp. 37-45.
Qu, Zening et al., "Keeping Multiple Views Consistent: Constraints, Validations, and Exceptions in Visualization Authoring," IEEE Transactions on Visualization and Computer Graphics, 2017, vol. 24, No. 1, pp. 468-477.
Raman, Vijayshankar et al., "Potter's Wheel: An Interactive Data Cleaning System," In Proceedings of the 27th International Conference on Very Large Data Bases, 2001, vol. 1, pp. 381-390.
Redmond, Stephen, "Visual Cues in Estimation of Part-To-Whole Comparisons," IEEE Transactions on Visualization and Computer Graphics, 2019, pp. 1-6.
Ritchie, Jacob et al., "A Lie Reveals the Truth: Quasimodes for Task-Aligned Data Presentation," In Proceedings of the 2019 CHI Conference on human Factors in Computing Systems, ACM, 193, 2019, pp. 1-13.
Rogowitz, Bernice E. et al., "The "Which Blair Project": A Quick Visual Method for Evaluating Perceptual Color Maps," In IEEE Visualization 2001, Proceedings, 2001, pp. 183-190.
Rogowitz, Bernice E. et al., "How Not to Lie with Visualization," Computers in Physics, 1996, vol. 10, No. 3, pp. 268-273.
Rosling, Hans et al., "Health advocacy with Gapminder animated statistics," Journal of Epidemiology and Global Health, 2011, vol. 1, No. 1, pp. 11-14.
Sacha, Dominik et al., "The Role of Uncertainty, Awareness, and Trust in Visual Analytics," IEEE Transactions on Visualization and Computer Graphics, 2016, vol. 22, No. 1, pp. 240-249.
Satyanarayan, Arvind et al., "Vega-Lite: A Grammar of Interactive Graphics," IEEE Transactions on Visualization and Computer Graphics, 2016, vol. 23, No. 1, pp. 341-350.
Segura, Sergio et al., "A Survey on Metamorphic Testing," IEEE Transactions on Software Engineering, 2016, vol. 42, No. 9, pp. 805-824.
Song, Hayeong et al., "Where's My Data? Evaluating Visualizations with Missing Data," IEEE Transactions on Visualization and Computer Graphics, 2018, vol. 25, No. 1, pp. 914-924.
Srinivasan, Arjun et al., "Augmenting Visualizations with Interactive Data Facts to Facilitate Interpretation and Communication," IEEE Transactions on Visualization and Computer Graphics, 2018, vol. 25, No. 1, pp. 672-681.
Stonebraker, Michael et al., "Data Curation at Scale: The Data Tamer System," In Proceedings of the 6th Biennial Conference on Innovative Data Systems Research, 2013, pp. 1-10.
Szafir, Danielle Albers, "The Good, the Bad, and the Biased: Five Ways Visualizations Can Mislead (and How to Fix Them)," ACM Interactions, 2018, vol. 25, No. 4, pp. 26-33.
Tableau, "Tableau Prep," https://www.tableau.com.products/prep/, 2020, pp. 1-13.
Trifacta, "Trifacta," https://www.trifacta.com/, 2020, pp. 1-8.

(56) References Cited

OTHER PUBLICATIONS

Trulia, "New York Real Estate Market Overview," https://www.trulia.com/real_estate/New_York-New_York/, 2020, Accessed: Feb. 11, 2020, pp. 1-3.
Valdez, André Calero et al., "A Framework for Studying Blases in Visualization Research," 2017, pp. 1-5.
Van Wijk, Jarke J., "The Value of Visualization," In VIS 05, IEEE Visualization, 2005, IEEE, pp. 79-86.
Vanderplas, Jacob et al., "Altair: Interactive Statistical Visualizations for Python," The Journal of Open Source Software, 2018, vol. 3, No. 32, pp. 1-2.
Veras, Rafael et al., "Discriminability Tests for Visualization Effectiveness and Scalability," IEEE Transactions on Visualization and Computer Graphics, 2019, pp. 1-10.
Vickers, Paul et al., "Understanding Visualization: A Formal Foundation using Category Theory and Semiotics," IEEE Transactions on Visualization and Computer Graphics, 2012, vol. 19, No. 6, pp. 1-14.
Wainer, Howard, "How to Display Data Badly," The American Statistician, 1984, vol. 38, No. 2, pp. 137-147.
Wang, Pei et al., "Uni-Detect: A Unified Approach to Automated Error Detection in Tables," In Proceedings of the 2019 International Conference on Management of Data, ACM, 2019, pp. 811-828.
Whitworth, Brian, "Polite Computing," Behaviour & Information Technology, 2005, vol. 24, No. 5, pp. 353-363.
Wood, Jo et al., "Design Exposition with Literate Visualization," IEEE Transactions on Visualization and Computer Graphics, 2018, vol. 25, No. 1, pp. 759-768.
Wu, Eugene et al., "Scorpion: Explaining Away Outliers in Aggregate Queries," Proceedings of the VLDB Endowment, 2013, vol. 6, No. 8, pp. 553-564.
Xiong, Cindy et al., "Illusion of Causality in Visualized Data," arXiv preprint arXiv:1908.00215, 2019, pp. 1-10.
Xiong, Cindy et al., "The Curse of Knowledge in Visual Data Communication," IEEE Tranactions on Visualization and Computer Graphics, 2019, pp. 1-12.
Zgraggen, Emanuel et al., "Investigating the Effect of the Multiple Comparisons Problem in Visual Analysis," In Proceedings of the 2018 CHI Conference on Human Factors in Computing Systems, ACM, 2018, pp. 1-12.
International Search Report and Written Opinion for International Patent Application No. PCT/US2020/050722 mailed Nov. 24, 2020, pp. 1-6.
Office Communication for U.S. Appl. No. 17/014,882 mailed Apr. 27, 2021, pp. 1-27.
S.Negash, "Business Intelligence," 2004, Communications of the Association for Information systems, vol. 13, pp. 177-195.
Eckerson, "Perfomance Dashboards Measuring, Monitoring, and Managing your Business," 2012, Business Book Summaries, pp. 1-11.
S. Lizotte-Latendresse et al., "Implementing Self-Service Business Analytics Supporting Lean Manufacturing: A State-Of-The-Art Review," 2018, 16th IFAC Symposium-Incom, pp. 1-6.
Groger, "The Operational Process Dashboard for Manufacturing," 2013, SciVerse ScienceDirect, pp. 205-210.
Yigitbasioglu, "A Review of Dashboards in Performance Management: Implications for Design and Research," 2012, International Journal of Accounting Informational Journal of Accounting Information Systems, vol. 13, pp. 41-59.
F. Adam, "Developing Practical Decision Support Tools Using Dashboards of Information," 2008, Springer Berlin Heidelberg, pp. 151-173.
Passlick, "A Self-Service Supporting Business Intelligence and Big Data Analytics Architecture," 2017, Proceedings der 13. Internationalen Tagung Wirtschaftsinformatik, Pag4s 1126-1140.
Shneiderman, "The Eyes Have It: A Task by Data Type Taxonomy for Information Visualizations," 1996, Proc. Visual Languages, pp. 1-9.
Alpar, "Self-Service Business Intelligence," 2016, Springer Fachmedien Wiesbaden, pp. 151-155.
Kaur, "A Review on Visualization Recommendation Strategies," 2017, In Proceedings of the 12th International Joint Conference on Computer Vision, Imaging and Computer Graphics Theory and Applications, vol. 3, pp. 266-273.
Hoang, "Dashboard by-Example: A Hypergraph-Based Approach to On-demand Data Warehousing Systems," 2012, IEEE International Conference on Systems, Man, and Cybernetics, pp. 1853-1858.
Zhang, "Ad Hoc Table Retrieval using Semantic Similarity," 2018, Creative Commons CC BY 4.0 License, pp. 1553-1562.
Key, "VizDeck: Self-Organizing Dashboards for Visual Analytics," 2012, SIGMOD International Conference on Management of Data, pp. 681-684.
Mazumdar, "A Knowledge Dashboard for Manufacturing Industries," 2012, Springer-Verlag Berlin Heidelberg, Oages 112-124.
Matera, "Peudom: A Mashup Platform for the End User Development of Common Information Spaces," 2013, Springer-Verlag Berlin Heidelberg, pp. 494-497.
Theorin, "An Event-Driven Manufacturing Information system Architecture," 2015, Diva, pp. 1-9.
Lennerholt, "Implementation Challenges of Self Service Business Intelligence: A Literature Review," 2018, Proceedings of the 51st Hawaii International Conference on System Sciences, pp. 5055-5063.
Elias, "Exploration Views: Understanding Dashboard Creation and Customization for Visualization Novices," 2011, Part IV, LNCS 6949, pp. 274-291.
Roberts, "State of the Art: Coordinated & Multiple Views in Exploratory Visualization," 2007, IEEE Computer Society Press pp. 61-71.
Palpanas, "Integrated Model-Driven Dashboard Development," 2007, Springer Science, pp. 1-14.
Resnick, "Building The Executive Dashboard," 2003, Proceedings of the Human Factors and Ergonomics Society 47th Annual Meeting, pp. 1639-1643.
Sarikaya, "What Do We Talk About When We Talk About Dashboards?," 2018, DOI 10.1109/TVCG.2018.2864903, IEEE Transactions on Visualization and Computer Graphics, pp. 1-11.
Claire, "Ontology-based Approach for Information Fusion," 2003, Proceedings of the sixth international conference on information fusion, vol. 1, pp. 522-529.
Park, "A Blended Metric for Multi-label Optimisation and Evaluation," 2019, Energy Transfer Processes in Polynuclear Lanthanide Complexes, pp. 719-734.
Kintz, "A Semantic Dashboard Description Language for a Process-oriented Dashboard Design Methodology," 2012, 2nd International Workshop on Model-based Interactive Ubiquitous Systems, pp. 1-6.
Bergamaschi, "A Semantic Approach to ETL Technologies," 2011, Journal Data & Knowledge Engineering, vol. 70, Issue 8, pp. 717-731.
International Search Report and Written Opinion for International Patent Application No. PCT/US2020/057780 mailed Feb. 2, 2021, pp. 1-8.
Office Communication for U.S. Appl. No. 16/368,390 mailed Mar. 2, 2020, pp. 1-8.
International Search Report and Written Opinion for International Patent Application No. PCT/US2020/038157 mailed Oct. 6, 2020, pp. 1-8.
MacKinlay, Jock, "Automating the Design of Graphical Presentations of Relational Information," ACM Transactions on Graphics, 1986, vol. 5, No. 2, pp. 110-141.
Touma, Rizkallah et al., "Supporting Data Integration Tasks with Semi-Automatic Ontology Construction," DOLAP '15: Proceedings of the ACM Eighteenth International Workshop on Data Warehousing and OLAP, 2015, pp. 89-98.
Buccella, Agustina et al., "Ontology-Based Data Integration Methods: A Framework for Comparison," Revista Colombiana de Computación, 2005, vol. 6, No. 1, pp. 1-24.
Office Communication for U.S. Appl. No. 16/915,963 mailed Jan. 7, 2022, pp. 1-9.
Office Communication for U.S. Appl. No. 17/014,882 mailed Jan. 25, 2022, pp. 1-6.

(56) References Cited

OTHER PUBLICATIONS

Wu, Aoyu et al., "MultiVision: Designing Analytical Dashboards with Deep Learning Based Recommendation," IEEE, arXiv preprint, arXiv:2107.07823, Jul. 2021, pp. 1-11.

Shi, Danqing et al., "Talk2Data: High-Level Question Decomposition for Data-Oriented Question and Answering," arXiv preprint, arXiv:2107.14420, Jul. 2021, pp. 1-11.

Wang, Yun et al., "DataShot: Automatic Generation of Fact Sheets from Tabular Data," IEEE Transactions on Visualization and Computer Graphics, vol. 26, No. 1, Aug. 2019, pp. 1-11.

Wang Baldonado, Michelle Q. et al., "Guidelines for Using Multiple Views in Information Visualization," AVI '00, In Proceedings of the Working Conference on Advanced Visual Interfaces, May 2000, pp. 1-10.

Chen, Xi et al., "Composition and Configuration Patterns in Multiple-View Visualizations," arXiv preprint, arXiv:2007.15407, Aug. 2020, pp. 1-11.

Crisan, Anamaria et al., "GEVITRec: Data Reconnaissance Through Recommendation Using a Domain-Specific Visualization Prevalence Design Space," IEEE Transactions on Visualization and Computer Graphics, TVCG Submission, Jul. 2021, pp. 1-18.

Office Communication for U.S. Appl. No. 16/732,027 mailed Feb. 25, 2022, pp. 1-6.

Office Communication for U.S. Appl. No. 16/944,085 mailed Mar. 17, 2022, pp. 1-6.

Office Communication for U.S. Appl. No. 16/903,967 mailed Mar. 18, 2022, pp. 1-11.

Office Communication for U.S. Appl. No. 16/944,064 mailed Mar. 22, 2022, pp. 1-10.

Office Communication for U.S. Appl. No. 16/915,963 mailed Mar. 23, 2022, pp. 1-4.

International Search Report and Written Opinion for International Patent Application No. PCT/US2022/012907 mailed Mar. 16, 2022, pp. 1-13.

Office Communication for U.S. Appl. No. 16/915,963 mailed Apr. 26, 2022, pp. 1-9.

Office Communication for U.S. Appl. No. 17/014,882 mailed Jun. 9, 2022, pp. 1-8.

Office Communication for U.S. Appl. No. 16/732,027 mailed Jun. 14, 2022, pp. 1-18.

Office Communication for U.S. Appl. No. 17/158,911 mailed Jun. 28, 2022, pp. 1-29.

Office Communication for U.S. Appl. No. 16/944,085 mailed Aug. 30, 2022, pp. 1-9.

Office Communication for U.S. Appl. No. 16/944,085 mailed Sep. 9, 2022, pp. 1-2.

Office Communication for U.S. Appl. No. 17/014,882 mailed Sep. 28, 2022, pp. 1-11.

Office Communication for U.S. Appl. No. 16/915,963 mailed Oct. 5, 2022, pp. 1-7.

Office Communication for U.S. Appl. No. 16/732,027 mailed Oct. 28, 2022, pp. 1-11.

Office Communication for U.S. Appl. No. 17/158,911 mailed Dec. 23, 2022, pp. 1-37.

Office Communication for U.S. Appl. No. 16/732,027 mailed Jan. 17, 2023, pp. 1-5.

Office Communication for U.S. Appl. No. 16/903,967 mailed Sep. 27, 2021, pp. 1-16.

Office Communication for U.S. Appl. No. 17/014,882 mailed Nov. 2, 2021, pp. 1-33.

International Search Report and Written Opinion for International Patent Application No. PCT/US2021/043167 mailed Oct. 26, 2021, pp. 1-7.

International Search Report and Written Opinion for International Patent Application No. PCT/US2021/043177 mailed Oct. 26, 2021, pp. 1-8.

Office Communication for U.S. Appl. No. 16/732,027 mailed Nov. 15, 2021, pp. 1-25.

International Search Report and Written Opinion for International Patent Application No. PCT/US2021/049229 mailed Nov. 16, 2021, pp. 1-8.

Office Communication for U.S. Appl. No. 16/944,064 mailed Nov. 26, 2021, pp. 1-50.

Office Communication for U.S. Appl. No. 17/866,091 mailed Mar. 2, 2023, pp. 1-30.

Office Communication for U.S. Appl. No. 17/158,911 mailed Mar. 8, 2023, pp. 1-6.

Office Communication for U.S. Appl. No. 16/732,027 mailed Mar. 8, 2023, pp. 1-9.

Office Communication for U.S. Appl. No. 17/588,145 mailed Apr. 26, 2023, pp. 1-16.

Office Communication for U.S. Appl. No. 17/158,911 mailed Apr. 27, 2023, pp. 1-40.

Office Communication for U.S. Appl. No. 17/344,633 mailed Jun. 27, 2023, pp. 1-43.

Extended European Search Report for European Patent Application No. 20881052.3 mailed Aug. 23, 2023, pp. 1-10.

Mutlu, Belgin et al., "VizRec: Recommending Personalized Visualizations," ACM Transactions on Interactive Intelligent Systems (TIIS), Nov. 2016, vol. 6, No. 4, Article 31, pp. 1-39.

\* cited by examiner

PROVIDING DATA VISUALIZATIONS BASED ON PERSONALIZED RECOMMENDATIONS

TECHNICAL FIELD

The present invention relates generally to data visualization, and more particularly, but not exclusively to, personalized recommendation of visualizations to users.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. In some cases, organizations employ various tools to generate visualizations of the some or all of their data. Employing visualizations to represent this data may enable organizations to improve their understanding of critical business operations and help them monitor key performance indicators. However, in some cases, organizations may have many visualizations that may be used for a variety of purposes. In some cases, selecting the appropriate visualizations for a given analysis may be challenging for non-authoring users who may be unfamiliar with the motivations or assumptions of the author who created the visualization. Likewise, in some cases, organizations may have many useful or popular visualizations that users may be unaware of. Thus, is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
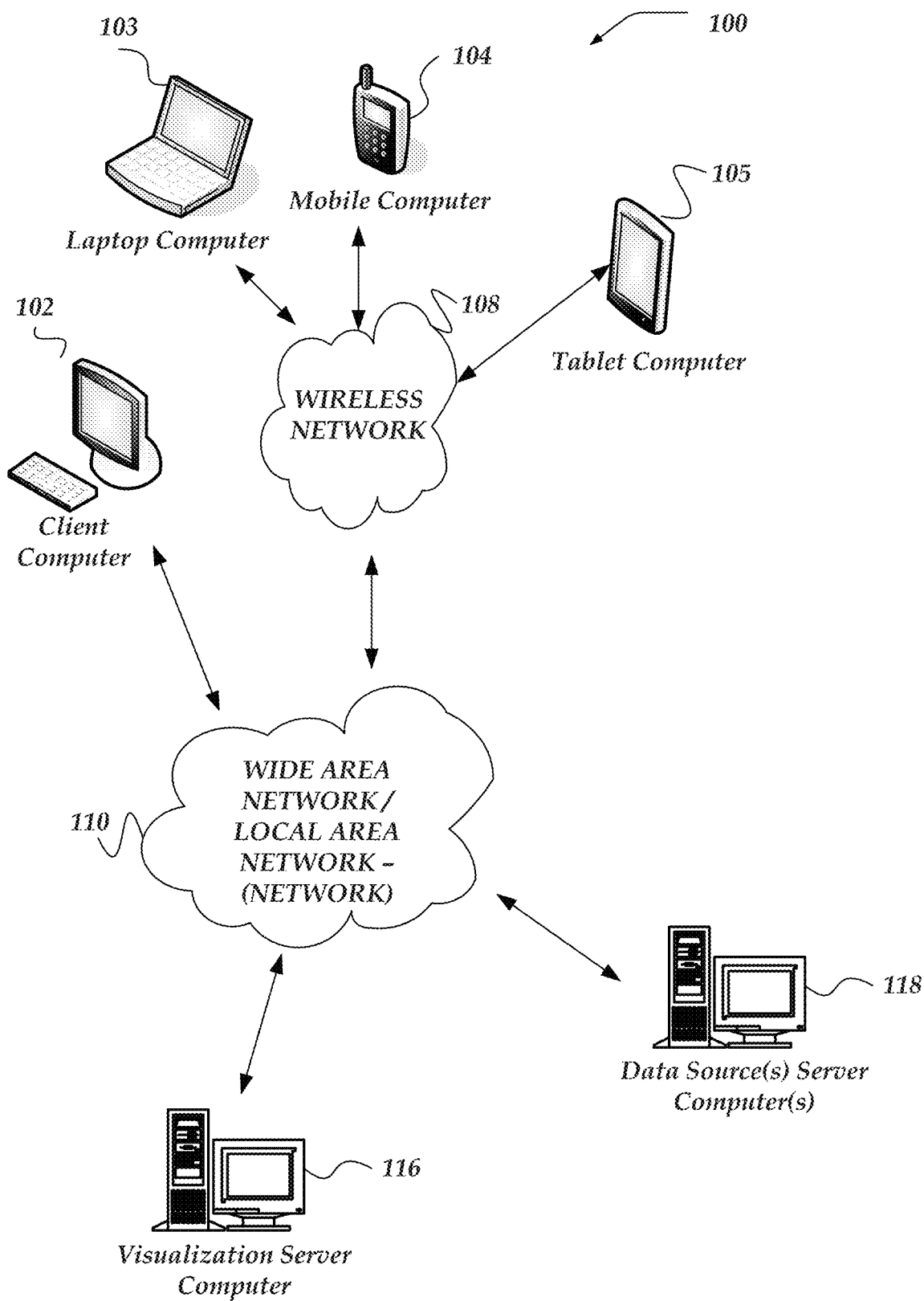
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein the term "data object" refers to one or more entities or data structures that comprise data models. In some cases, data objects may be considered portions of the data model. Data objects may represent individual instances of items or classes or kinds of items.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As user herein the "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "display object" refers to one or more data structures that comprise visualization models. In some cases, display objects may be considered portions of the visualization model. Display objects may represent individual instances of items or entire classes or kinds of items that may be displayed in a visualization. In some embodiments, display objects may be considered or referred to as views because they provide a view of some portion of the data model.

As used herein the term "recommendation model" refers to one or more data structures that include machine learning based models that may be arranged to predict visualizations for users. In some cases, there may be different types of recommendation models that may be based on different types of machine learning. Likewise, in some embodiments, different recommendation models may be arranged for recommending visualizations based on different criteria or for different purposes. In some cases, recommendation models may include one or more heuristics, filters, or the like, that work in conjunction with one or more machine learning sub-models.

As used herein the term "baseline model" refers to a recommendation model that has been trained or tuned based on training data associated with public or common usage history of a general population of users rather than users associated with the organization. Baseline models may be used to bootstrap initial recommendation models that may be used until sufficient training data is collected to train personalized models for users in an individual organization.

As used herein the term "user profile" refers to a data structure that includes information or data that is based on or associated with one or more characteristics of an individual user. For example, user profiles may include information that represents information, such as, user identity, group membership, role, access rights, previous activity, preferred visualizations, user preferences, or the like. In some cases, user profiles may include references or pointers to additional information including historical activity logs, telemetry information, or the like. In some embodiments, some or all values included in user profiles may be normalized, weighted, curved, shaped, or the like, to enable modeling engines to train recommendation models or for use by recommendation engines to recommend visualizations based on user profiles.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing visualizations of data using one or more processors that execute one or more instructions to perform as described herein. In one or more of the various embodiments, a plurality of visualization models and a user profile may be provided such that the plurality of visualization models and the user profile may be associated with an organization.

In one or more of the various embodiments, a complexity score for the organization may be provided based on one or more characteristics of the organization. In one or more of the various embodiments, providing the complexity score for the organization may include: determining a number of users associated with the organization; determining a number of visualization models associated with the organization; and providing the complexity score based on the greater of the number of users associated with the organization and the number of visualization models associated with the organization. In one or more of the various embodiments, the one or more characteristics of the complexity score may include one or more of: a number of employees of the organization; a number of visualization models associated with the organization; or a classification of the organization based on one or more functions and market participation by the organization.

In one or more of the various embodiments, a recommendation model may be provided based on the complexity score and a baseline model.

In one or more of the various embodiments, the recommendation model may be employed to determine one or more recommended visualization models of the plurality of visualization models based on the user profile and one or more of an overall popularity of the one or more visualization models among all users, or the popularity of the visualization model with other user profiles having a characteristic that corresponds to a same characteristic of the user profile such that the recommendation model associates each recommended visualization model with a confidence score.

In one or more of the various embodiments, employing the recommendation model to determine the one or more recommended visualization models may include generating one or more natural language narratives that include one or more reasons for each recommendation based on the recommendation model, wherein the one or more reasons include one or more of a popularity of a recommended visualization model across all users, or activity associated with other users that are similar to the user.

In one or more of the various embodiments, generating the recommendation model may include: determining one or more sub-models that recommend the one or more visualization models based on the overall popularity of the one or more visualization models among all users; determining one or more other sub-models that recommend visualization models based on the popularity of the visualization model with other user profiles having the characteristic that corresponds to the same characteristic of the user profile; and associating one or more weight values with the one or more sub-models and the one or more other sub-models, wherein the one or more weight values determine how the one or more sub-models or the one or more other sub-models are used to determine the one or more recommended visualization models.

In one or more of the various embodiments, the one or more recommended visualization models may be rank ordered based on each associated confidence score. In one or more of the various embodiments, ordering the one or more recommended visualization models may include: determining a first portion of the one or more recommended visualization models that are accessible to the user based on access permission information associated with the user; determining a second portion of the one or more recommended visualization models based on one or more visualization models previously recommended to the user; determining a third portion of the one or more recommended visualization models based on one or more other visualization models previously accessed by the user; and modifying the rank ordered list the one or more recommended visualization models based on one or more of removing or de-ranking the first portion of the one or more recommended visualization models, the second portion of the one or more recommended visualization models, and the third portion of the one or more recommended visualization models.

In one or more of the various embodiments, a report that includes a rank ordered list of the one or more recommended visualization models may be provided to a user associated with the user profile.

In one or more of the various embodiments, one or more actions of the user that are associated with the one or more recommend visualization models may be monitored. In one or more of the various embodiments, one or more other actions of the user that are associated with one or more other visualization models may be monitored. In one or more of the various embodiments, information associated with the one or more actions and the one or more other actions may be stored in a data store. In one or more of the various embodiments, the user profile may be updated based on the one or more actions and the one or more other actions. And, in one or more of the various embodiments, the recommendation model may be trained based on the information stored in the data store and the updated user profile.

In one or more of the various embodiments, a community data store that stores information associated with one or more actions of a public community may be provided. In one or more of the various embodiments, a recommendation model may be trained based on the community data store, wherein the trained recommendation model. And, in one or more of the various embodiments, the baseline model may be provided based on the trained recommendation model.

In one or more of the various embodiments, feedback information that may be associated with the report may be monitored. In one or more of the various embodiments, one or more scores based on the feedback information may be provided. And, in some embodiments, the one or more scores may be employed to modify one or more of the recommendation model or the rank ordered list the one or more recommended visualization models.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, visualization server computer 116, data source server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, data source server computer 118, or other computers.

Client computers 102-105 may further be configured to include a client application that enables an end-user to log into an end-user account that may be managed by another computer, such as visualization server computer 116, data source server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116, data source server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, data source server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116, data source server computer 118 are described in more detail below in conjunction with FIG. 3. Although FIG. 1 illustrates visualization server computer 116, data source server computer 118, or the like, each as a single computer, the innovations or embodiments are not so limited. For example, one or more functions of visualization server computer 116, data source server computer 118, or the like, may be distributed across one or more distinct network computers. Moreover, in one or more embodiments, visualization server computer 116, data source server computer 118 may be implemented using a plurality of network computers. Further, in one or more of the various embodiments, visualization server computer 116, data source server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
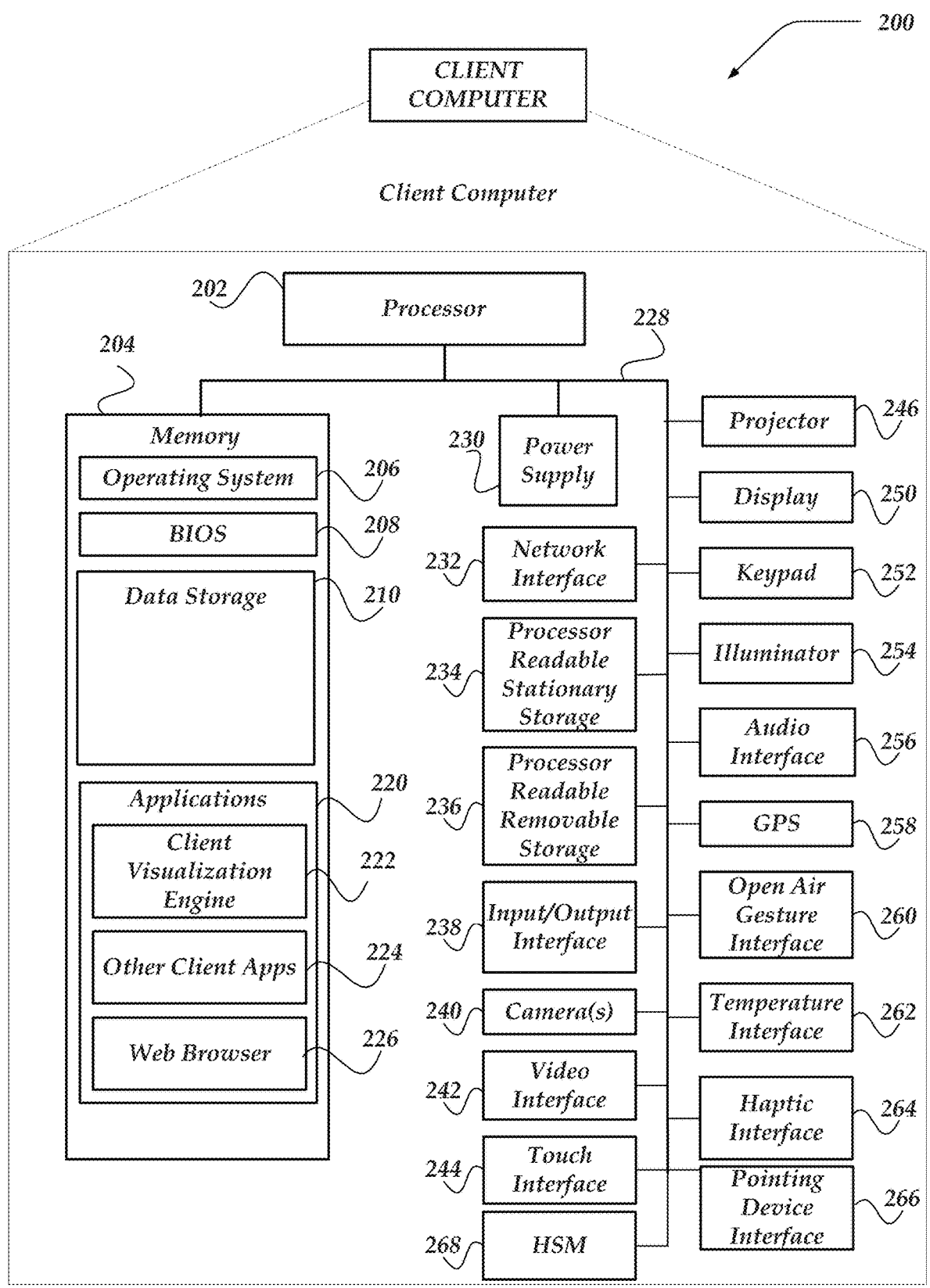
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client visualization engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
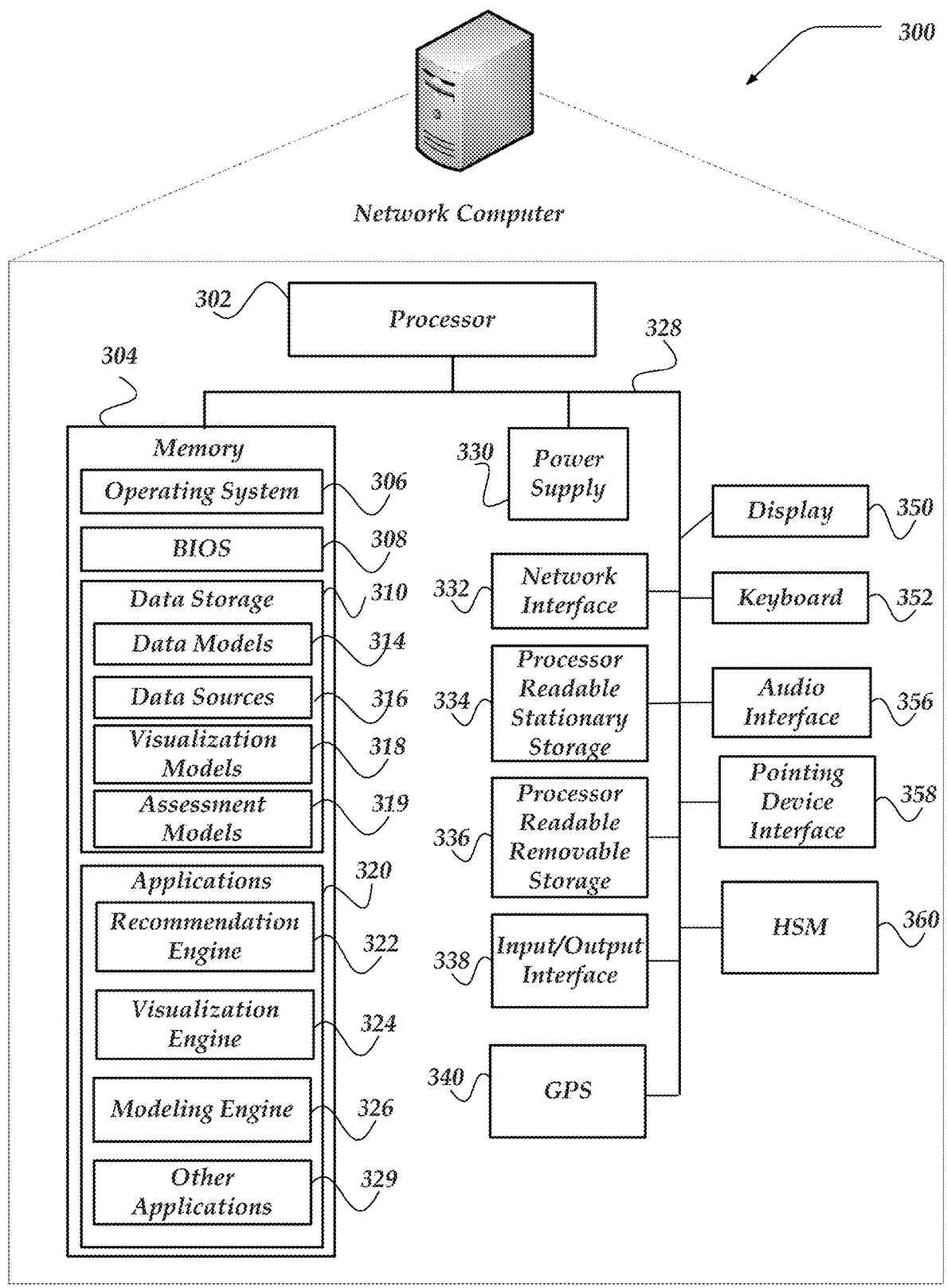
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, data source server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, recommendation engine 322, visualization engine 324, modeling engine 326, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, data sources 316, visualization models 318, assessment models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include recommendation engine 322, visualization engine 324, modeling engine 326, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, recommendation engine 322, visualization engine 324, modeling engine 326, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to recommendation engine 322, visualization engine 324, modeling engine 326, other applications 329, or the like, may be provisioned and de-commissioned automatically.

Also, in one or more of the various embodiments, recommendation engine 322, visualization engine 324, modeling engine 326, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
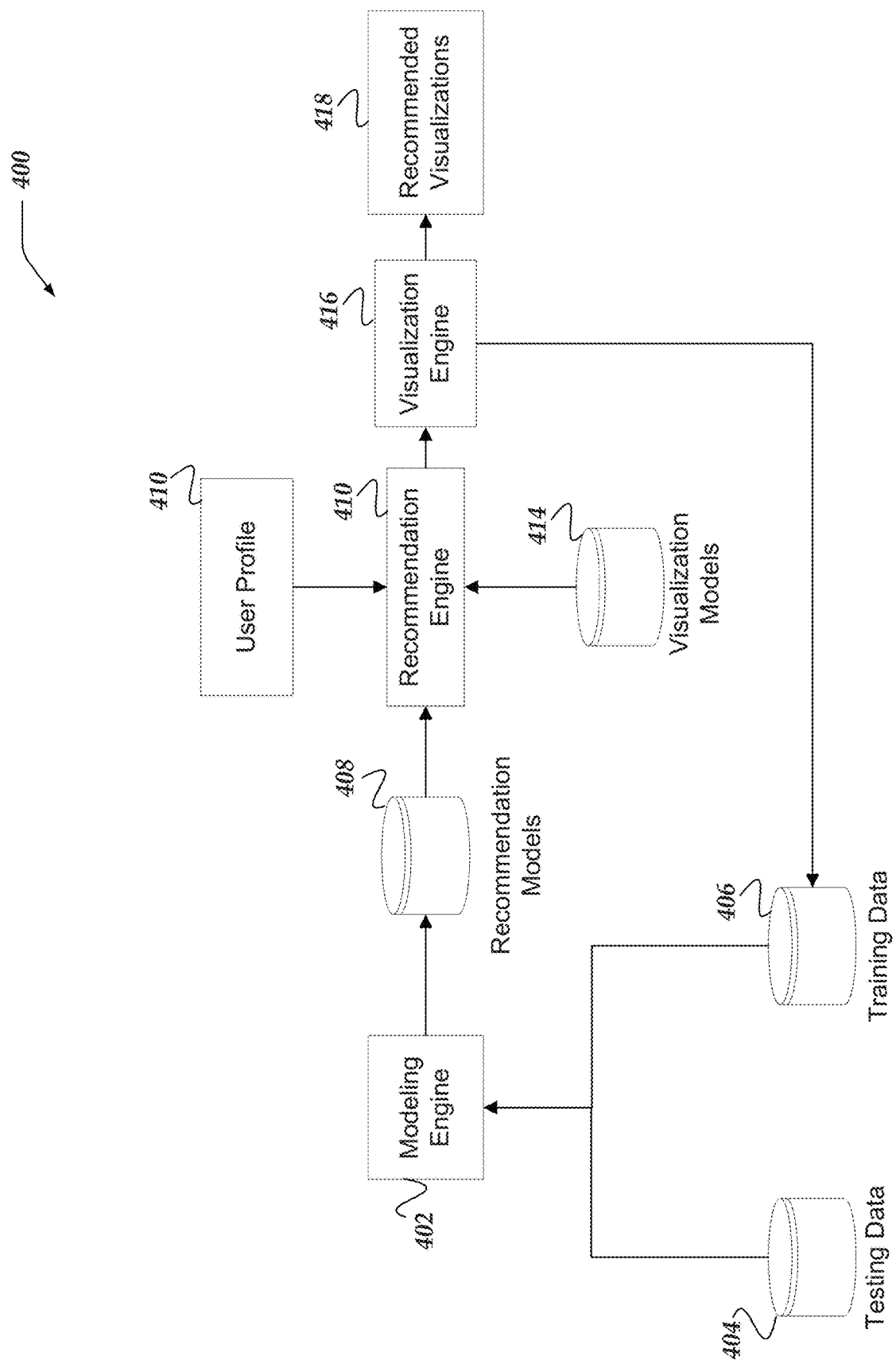
FIG. 4 illustrates a logical architecture of a system for providing data visualizations based on personalized recommendations in accordance with one or more of the various embodiments.

FIG. 4 illustrates a logical architecture of system 400 for providing data visualizations based on personalized recommendations in accordance with one or more of the various embodiments. In one or more of the various embodiments, system 400 may be comprised of various components, including, one or more modeling engines, such as, modeling engine 402;

In one or more of the various embodiments, system 400 may be arranged to include various components including: modeling engine 402; testing data store 404; train data store 406; recommendation models data store 408; recommendation engine 410; visualization models 414; visualization engine 416; or the like.

In some embodiments, user profiles, such as, user profile 412 may be provided as inputs to recommendation engine 410 for recommending visualizations. Accordingly, in some embodiments, the recommendation engine may employ one or more recommendation models and user profiles to determine one or more recommended visualizations. In some embodiments, one or more of the recommendation models may be provided to visualization engine 416. Accordingly, in some embodiments, visualization engine 416 may employ one or more visualization models associated with the recommended visualization In one or more of the various embodiments, recommendation engines may be arranged to employ one or more recommendation models to recommend one or more visualizations to users based on their associated user profiles. In some embodiments, visualization engines may monitor user interactions with the recommended visualizations to generate metrics that may be used to train or modify the recommendation models based on user response to the recommendations.

Also, in one or more of the various embodiments, overtime, user profiles may be updated in response to one or more characteristics of the user changing. For example, users may be assigned new or additional roles in an organization. Likewise, in some embodiments, user behavior may be monitored to determine values in the user profiles. In some embodiments, this enables user profiles to capture circumstances where a user's activity deviates from expectations. For example, in some embodiments, user roles for one organization may loosely defined such that users in the same role may have widely divergent behavior. Whereas, in some other organizations, user roles may be strictly defined or enforced such that a user's role may be a strong indicator regarding the type of information.

In one or more of the various embodiments, recommendation models may be arranged to make various types of recommendations. For example, in some embodiments, one or more recommendation models may be directed toward enabling users to discover one or more visualizations that they may not have known about or visualizations that they may not have seen before. Likewise, for example, in some embodiments, one or more other recommendation models may be directed to supporting a user's current workflow.

In one or more of the various embodiments, recommendation models directed to discovery may be arranged to restrict recommendations to visualizations that a user has not used before. Accordingly, in some embodiments, visualizations that have been visited or otherwise used by the user may be eliminated from recommendations list. In some embodiments, the restrictions may be absolute, such as, all previously known visualizations may excluded from discovery recommendations. Also, in some embodiments, the restrictions may be probabilistic such that some previously seen visualizations may be included in recommendation lists. In some embodiments, time decay formulas may be employed such that the longer it has been since a visualization has been used by the user, the more likely the "known visualization" restriction may be removed.

In one or more of the various embodiments, one or more recommendation models directed to discovery may be trained or customized to provide recommendations based on the general trends or tendencies of other users in the organization. In contrast, in some embodiments, one or more recommendation models directed to supporting an individual user (e.g., workflow support) may be customized for the individual user.

In one or more of the various embodiments, because recommendation models may be arranged to support individual organizations or user of individual organizations, each organization may have different training data. Accordingly, in some embodiments, training data may vary widely in quantity or characteristics. Also, in some embodiments, some organizations may have accumulated many visualizations before providing data visualizations based on personalized recommendations has been enabled. In contrast, in some embodiments, other organizations may have deployed visualization recommendation at the same time they begin using the visualization system such that they have no visualizations and no usage history.

Accordingly, in some embodiments, one or more baseline models may be provided to enable meaningful recommendations for organizations that may not have sufficient training data. In some embodiments, baseline models may be trained based on training data that may be based on community data. In some embodiments, community data may be provided by other users or organizations that have volunteered to provide some or all of their activity information for training baseline models.

Thus, in some embodiments, organizations that lack sufficient data for training their own recommendation models may be provided one or more recommendation models that are based on baseline models. As they generate their own training data, it may be employed for training recommendation models based on their own data.

In one or more of the various embodiments, visualization system may provide more than baseline model that may be tailored for different types of organizations. Also, in some embodiments, different baseline models may be provided to make recommendations for organizations based on a complexity score that may be associated with each organization.

In one or more of the various embodiments, recommendation engines may be arranged to employ one or more formulas for determining the complexity score for an organization. For example, in some embodiments, complexity scores may be based on finding the number of users for an organization; finding the number of visualizations for an organization; take the greater of the number of users or the number of visualizations to determine the number of free variables for the recommendation models for the organization. Note, in some embodiments, recommendation engines may be arranged to employ other rules or formulas provided via configuration information to determine a complexity score for an organization as well as how the complexity score maps to different baseline models or recommendation model configurations.

Figure 5:
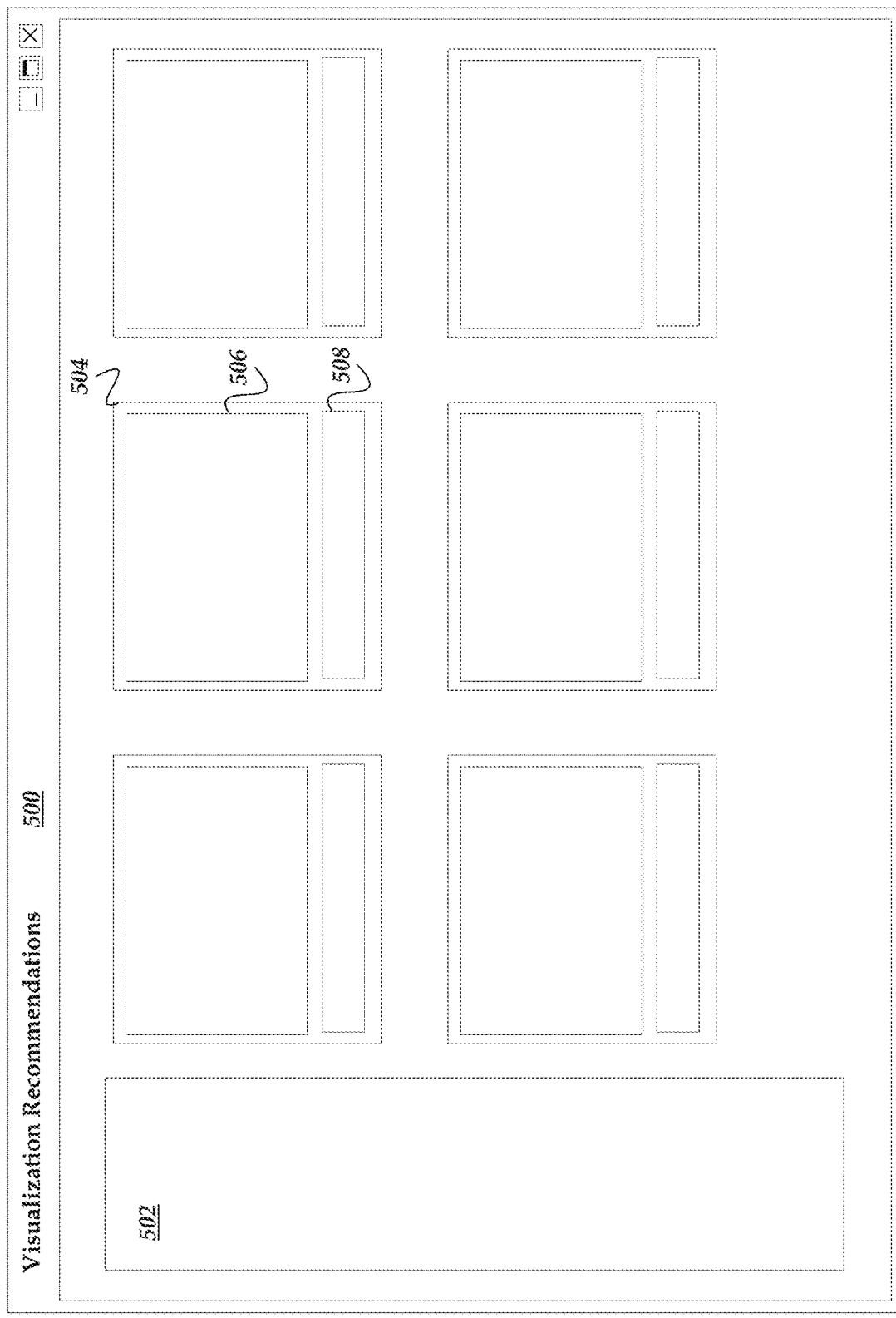
FIG. 5 illustrates a logical representation of a portion of a user interface for providing data visualizations based on personalized recommendations in accordance with one or more of the various embodiments.

FIG. 5 illustrates a logical representation of a portion of user interface 500 for providing data visualizations based on personalized recommendations in accordance with one or more of the various embodiments. In some embodiments, user interface 500 may be arranged to include one or more panels, such as, panel 502, panel 504, or the like.

In one or more of the various embodiments, user interface 500 may be arranged to display one or more recommended visualizations to a user. In some embodiments, panels, such as, panel 504 may display compact representations (e.g., thumbnails, or the like) of a given recommended visualization. In this example, sub-panel 506 may represent a compact visual representation of a recommended visualization. Also, in some embodiments, additional information, including explanatory natural language explanation narratives may be displayed (or accessed via) sub-panels, such as, sub-panel 508.

In one or more of the various embodiments, the panels associated with the recommended visualizations may be displayed in rank order based on a confidence score that represents the strength of a given recommendation.

Accordingly, in some embodiments, users may be enabled to select a visualization from the collection of displayed recommended visualizations.

In one or more of the various embodiments, panels, such as, panel 504 may be associated with other User Interface elements that enable users to provide a score that represents their agreement or disagreement with the recommendations. Accordingly, in some embodiments, the modeling engine may employ these scores to modify recommendation models for the user or other users in the same organization.

In one or more of the various embodiments, explanatory narratives associated with the recommended visualizations may describe the reason why a given visualization has been recommended. In some embodiments, narrative text may be associated with one or more inputs or signals associated with a user. For example, if the strongest signal for recommending a visualization may be the past actions of similar users, the narrative information associated with the recommendation include narrative text that explains that recommendation has been made based on the preferences of other similar users.

In one or more of the various embodiments, user interface 500 may be arranged to enable users to drill down (e.g., through sub-panel 508) to explore additional details associated with a given recommendation.

Generalized Operations

FIGS. 6-9 represent generalized operations for providing data visualizations based on personalized recommendations in accordance with one or more of the various embodiments. In one or more of the various embodiments, processes 600, 700, 800, and 900 described in conjunction with FIGS. 6-9 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 6-9 may be used for providing data visualizations based on personalized recommendations in accordance with at least one of the various embodiments or architectures such as those described in conjunction with FIGS. 4-5. Further, in one or more of the various embodiments, some or all of the actions performed by processes 600, 700, 800, and 900 may be executed in part by recommendation engine 322, visualization engine 324, modeling engine 326 one or more processors of one or more network computers.

Figure 6:
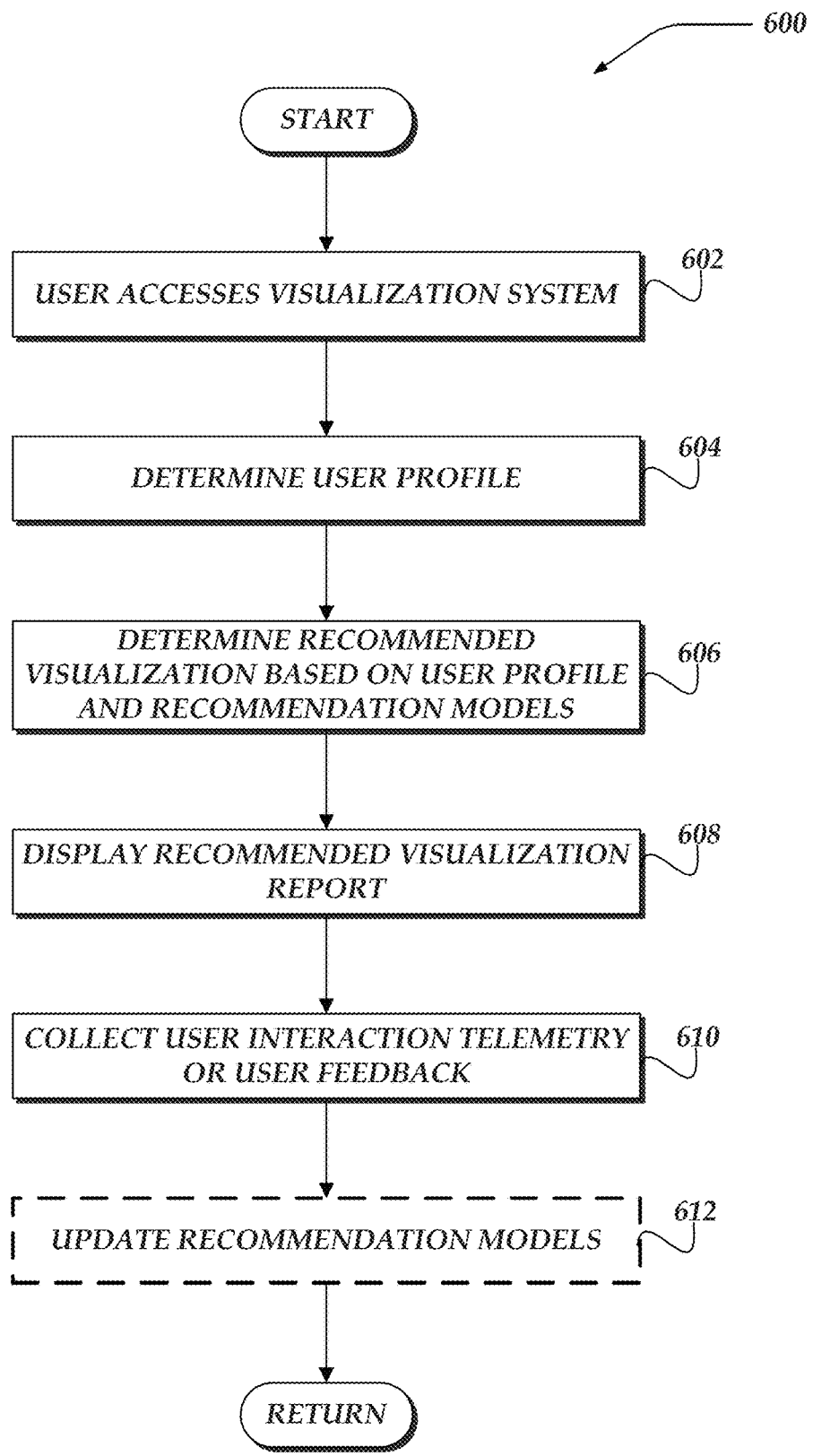
FIG. 6 illustrates an overview flowchart for a process for providing data visualizations based on personalized recommendations in accordance with one or more of the various embodiments.

FIG. 6 illustrates an overview flowchart for process 600 for providing data visualizations based on personalized recommendations in accordance with one or more of the various embodiments. After a start block, at block 602, in one or more of the various embodiments, a user may access the visualization system. At block 604, in one or more of the various embodiments, a user profile may be determined for the user. At block 606, in one or more of the various embodiments, a recommendation engine may be arranged to determine one or more recommended visualizations based on the a user profile associated with the user and one or more recommendation models. At block 608, in one or more of the various embodiments, the visualization system may be arranged to recommend one or more visualizations to the user. In one or more of the various embodiments, the one or more recommended visualizations may be presented to the user in a user interface. At block 610, in one or more of the various embodiments, the visualization system may be arranged to collect information associated with user interaction telemetry, user feedback, or the like. At block 612, in one or more of the various embodiments, optionally, the visualization system may be arranged to update one or more recommendation models. In some embodiments, this block may be considered optional because one or more conditions may be evaluated to determine if one or more recommendation models should be updated or retrained. Next, in one or more of the various embodiments, control may be returned to a calling process.

Figure 7:
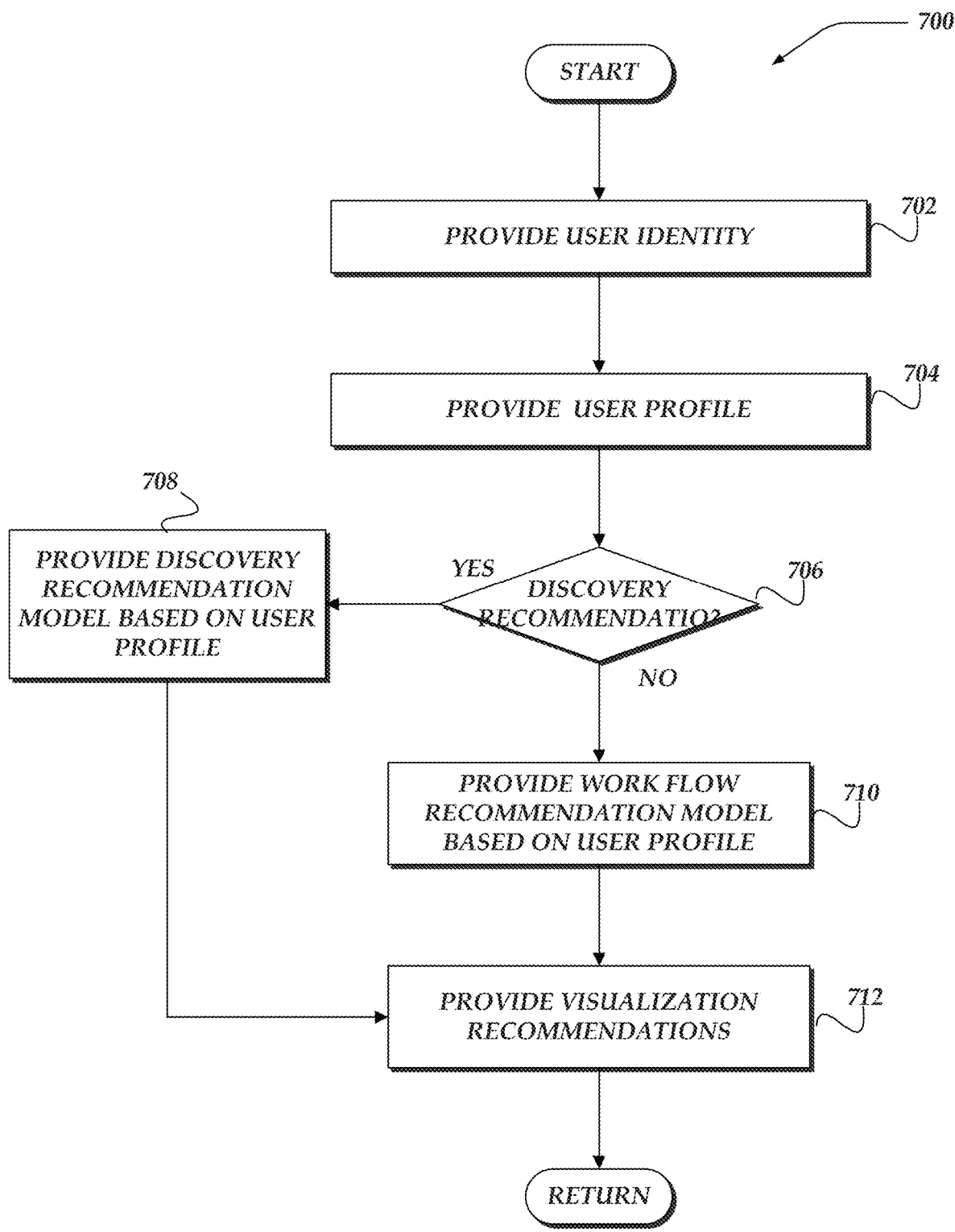
FIG. 7 illustrates a flowchart for a process for providing data visualizations based on personalized recommendations in accordance with one or more of the various embodiments.

FIG. 7 illustrates a flowchart for process 700 for providing data visualizations based on personalized recommendations in accordance with one or more of the various embodiments. After a start block, at block 702, in one or more of the various embodiments, user identify information may be provided. In one or more of the various embodiments, users accessing the visualization system may provide credential information that may be used to identify the user.

At block 704, in one or more of the various embodiments, a user profile may be provided based on the user identity. In one or more of the various embodiments, user profiles may be maintained for each user in an organization. Accordingly, in one or more of the various embodiments, the user profile for a given user may be determined based on the user identity information.

At decision block 706, in one or more of the various embodiments, if the pending recommendation is a discovery recommendation, control may flow to block 708; otherwise, control may flow to block 710. As described herein, recommendation engines may be arranged to employ different types of recommendation models for different situations or circumstances. In this example, the recommendation models may include: one or more recommendation models arranged to discover visualizations that may be useful for a user; and one or more recommendation models arranged for recommending visualizations that may support or improve the workflow of a user. In some embodiments, recommendations based on recommendation models for more than one situation may be employed rather than choosing one or the other. Thus, in some embodiments, control may flow to block 708 and block 710 rather than one or the other.

At block 708, in one or more of the various embodiments, recommendation engines may be arranged to provide one or more recommendation models (e.g., discovery models) that may be designed to introduce users to visualizations they may be unaware of or otherwise have not seen before.

In one or more of the various embodiments, one or more discovery models may be arranged to employ long-term usage statistics to uncover user preferences to determine one or more recommendations.

At block 710, in one or more of the various embodiments, recommendation engines may be arranged to provide one or more recommendation models (workflow support models, e.g.) that may provide recommendations that may be targeted at supporting the user's current workflow. Accordingly, in some embodiments, recommendations may be based on a user's recent interaction metrics.

At block 712, in one or more of the various embodiments, recommendation engines may be arranged to recommend one or more visualizations based on the provided recommendation models.

In some embodiments, more than one type of recommendation models is employed, a blended recommendation may be produced that includes recommendations based on one or more discovery models or one or more workflow models. In some embodiments, recommendations based on different types of recommendation models may be provided in separate lists or in one integrated list. Next, in one or more of the various embodiments, control may be returned to a calling process.

Figure 8:
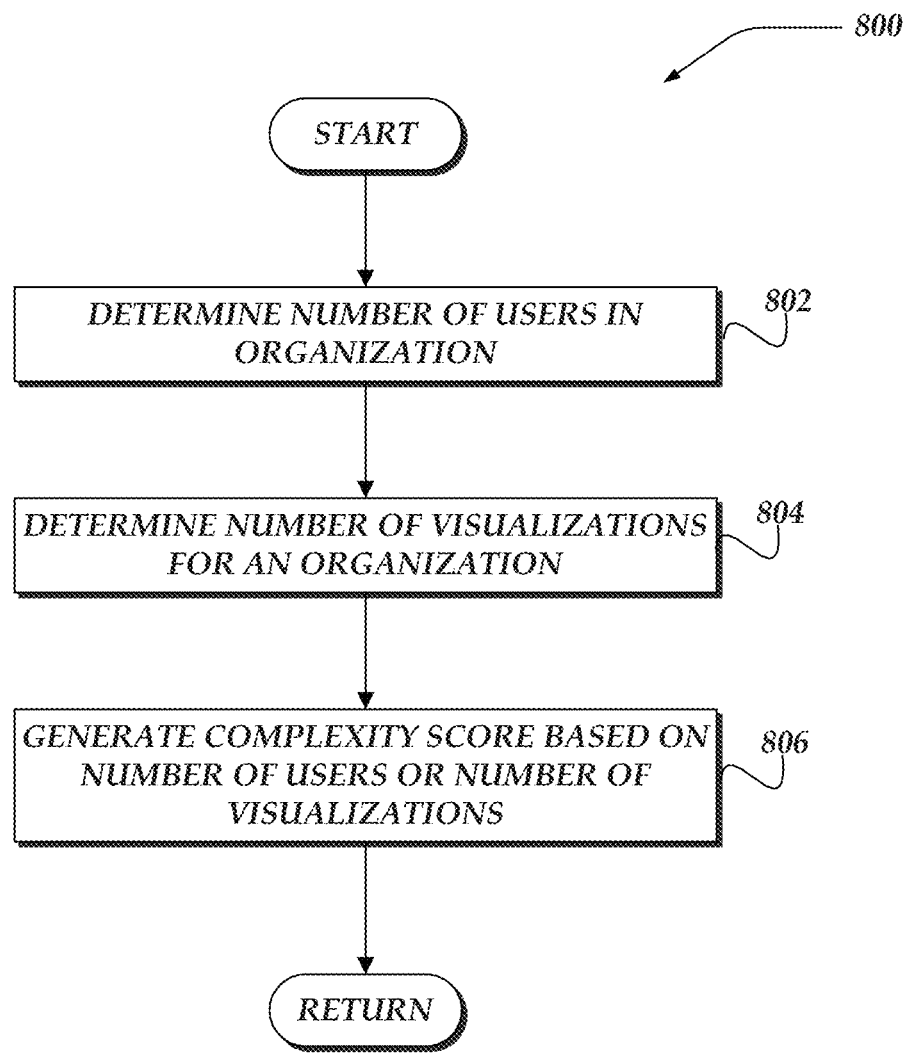
FIG. 8 illustrates a flowchart for a process for providing initial recommendation models based on a baseline model in accordance with one or more of the various embodiments.

FIG. 8 illustrates a flowchart for process 800 for providing initial recommendation models based on a baseline model in accordance with one or more of the various embodiments. After a start block, at block 802, in one or more of the various embodiments, recommendation engines may be arranged to determine the number of users associated with an organization. In some embodiments, the number of users may be different than the number of employees in an organization. In some embodiments, configuration information provided by the organization may include the number of employees that are expected to use the visualization system. In some embodiments, other configuration information, such as, licensing information may include hard or defined limits on the maximum number of users.

At block 804, in one or more of the various embodiments, recommendation engines may be arranged to determine the number of visualizations associated with the organization. In some embodiments, organizations may have one or more existing visualizations rather than starting from zero. For example, an organization may be using the visualization system for period of time before activating the personalized recommendation facilities. Accordingly, in one or more of the various embodiments, they may have a collection of visualization authored before recommendation engines are deployed.

At block 806, in one or more of the various embodiments, recommendation engines may be arranged to generate a complexity score based on organization metrics, such as, the number of users or the number of visualizations that may be arranged to associated with on organization. In one or more of the various embodiments, the organization metrics may be mapped to a complexity score. In some embodiments, recommendation engines may be arranged to determine complexity scores based on rules or formulas provided via configuration information. Next, in one or more of the various embodiments, control may be returned to a calling process.

Figure 9:
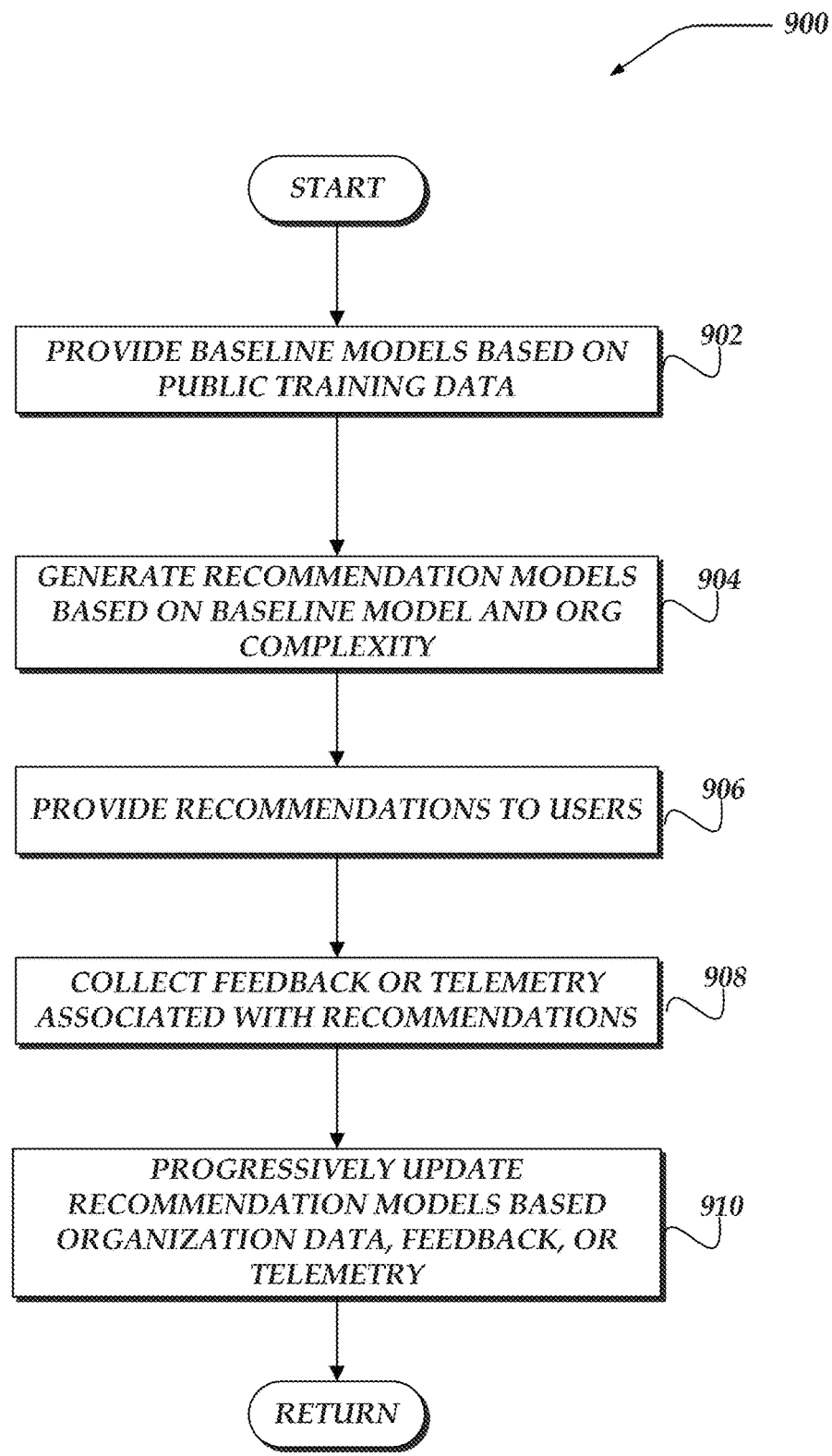
FIG. 9 illustrates a flowchart for a process for providing initial recommendation models based on a baseline model in accordance with one or more of the various embodiments.

FIG. 9 illustrates a flowchart for process 900 for providing initial recommendation models based on a baseline model in accordance with one or more of the various embodiments. After a start block, at block 902, in one or more of the various embodiments, recommendation engines may be arranged to provide one or more baseline models that may be based on public or common training data.

In one or more of the various embodiments, if an organization begins using the visualization system, customized or personalized recommendation models may be unavailable. Accordingly, one or more baseline models that may be based on public, shared, or common data may be provided. In some embodiments, baseline models may be trained using community data. In some embodiments, community data may be based on real data associated with other organizations. Accordingly, in some embodiments, community data may be real data that has been stripped of sensitive information. In some embodiments, organizations may be enabled to opt-in to have some or all of their historical interaction information included in a community data program.

Also, in some embodiments, a visualization system may offer a free or public service that may be used for collecting interaction information that may employed to train baseline models.

In one or more of the various embodiments, baseline models may be directly derived from one or more personalized recommendation models rather being derived from community data. In some embodiments, less complex or less detailed versions of recommendation models may be used as baseline models. In some cases, early generations of recommendation models trained for one or more organizations may be used as baseline models for new organizations.

In one or more of the various embodiments, different baseline models may be provided for use with different types of organizations or users. In some embodiments, baseline models may be maintained for different types of industries, problem domains, countries, or the like. Accordingly, in one or more of the various embodiments, commonalities that may exist within industries, problem domains, countries, or the like, may be represented in one or more baseline models.

At block 904, in one or more of the various embodiments, recommendation engines may be arranged to generate one or more recommendation models based on the one or more baseline models and the complexity of the organization.

In one or more of the various embodiments, an initial organization profile may be developed based on known or provide information. In one or more of the various embodiments, an organization profile may include information, such as, industry, problem domain, country, number of employees, enterprise size, revenue, or the like.

Accordingly, in some embodiments, a recommendation engine may be arranged to map one or more baseline models to an organization based on one or more mapping rules. In some embodiments, recommendation engines may be arranged to determine the rules for mapping baseline models to organizations based on configuration information.

Further, in some embodiments, recommendation engines may be arranged to generate one or more initial recommendation models based on baseline models intended for different types of users. For example, in one or more of the various embodiments, one or more baseline models may be designed for providing recommendations for executives while other baseline models may be designed for providing recommendations to line workers. Likewise, in some embodiments, one or more different baseline models may be designed for users in different areas of function. For example, one or more baseline models may be designed for user associated with marketing functions while other baseline models may be designed for users with engineering functions.

At block 906, in one or more of the various embodiments, recommendation engines may be arranged to recommend one or more visualizations to users. In one or more of the various embodiments, recommendation engines may be arranged to employ user profile information as inputs to one or more recommendation models. Accordingly, in some embodiments, one or more visualizations may be recommended based on the user profile and the one or more recommendation models.

In one or more of the various embodiments, each recommendation may be associated with a confidence that may indicate a relative strength of the recommendation. Accordingly, in some embodiments, recommendation engines may be arranged to present the recommendations to users in rank order based on their associated confidence scores.

At block 908, in one or more of the various embodiments, recommendation engines may be arranged to collect user telemetry or user feedback associated with the recommended visualizations. In one or more of the various embodiments, if recommended visualizations are presented to user, the recommendation engines may request feedback from the users that may indicate agreement or disagreement with the recommendations or the ranking of the recommendations.

Also, in one or more of the various embodiments, monitoring how users interact with recommended visualizations may generate metrics that may be used for evaluating the effectiveness of the recommendation models that provided the recommendations.

At block 910, in one or more of the various embodiments, recommendation engines may be arranged to progressively update one or more recommendation models based on organization data, user feedback, user telemetry, or the like. In one or more of the various embodiments, if one or more measures associated with the information collected for an organization and its users may exceed one or more thresholds, model retraining may be triggered. In some embodiments, the collected information may be stored as private training data set for an organization. Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed is:

1. A method comprising:
   at a computer system in communication with a display, the computer system having one or more processors and memory storing one or more programs, wherein the one or more programs are configured to be executed by the one or more processors:
      for a selected user of a plurality of users stored in association with an organization of a plurality of organizations, displaying one or more recommended data visualizations that are generated using a recommendation model and a baseline model, wherein:
      the baseline model is trained based on usage of data visualizations by users other than the plurality of users stored in association with the organization; and
      the recommendation model corresponds to the baseline model additionally trained based on (i) usage of data visualizations by a selected user and (ii) a complexity score of the organization calculated based on at least a respective number of the plurality of users associated with the organization and data visualizations stored in association with the organization, wherein the recommendation model further comprises:
         one or more first sub-models that generate the one or more recommended data visualizations based on a first popularity score of the one or more recommended data visualizations among the plurality of users stored in association with the organization and among the users other than the plurality of users stored in association with the organization;
         one or more second sub-models that generate the one or more recommended data visualizations based on a second popularity score of the one or more recommended data visualizations among users having a role that corresponds to a same role of the selected user; and
         one or more weight values applied to one or more outputs of the one or more first and second sub-models, wherein the one or more weight values determine how the one or more first and second sub-models are used to determine the one or more recommended data visualizations.

2. The method of claim 1, wherein the recommendation model corresponding to the baseline model is further trained based on usage of data visualizations by the plurality of users.

3. The method of claim 1, wherein the one or more recommended data visualizations are further selected by the recommendation model based on data visualizations explored by the selected user in a current workflow.

4. The method of claim 1, wherein the recommendation model is further trained based on a role of the selected user.

5. The method of claim 1, further comprising:
   displaying the one or more recommended data visualizations in a ranked order based on a confidence score.

6. The method of claim 5, wherein the confidence score is calculated based on a score provided by the selected user for respective data visualizations of the one or more recommended data visualizations, the method further comprising:
   determining one or more data visualizations available to the selected user based on access permission information associated with the selected user;

determining a first subset of the one or more data visualizations that have previously been recommended to the selected user;
determining a second subset of the one or more data visualizations that have been previously accessed by the selected user; and
displaying the one or more recommended data visualizations without the first subset and the second subset.

7. The method of claim 5, wherein displaying the one or more recommended data visualizations in the ranked order based on the confidence score further comprises:
determining one or more data visualization that have previously been recommended to a selected user;
determining a first subset of the one or more recommend data visualizations that have been previously accessed by the selected user; and
displaying the one or more recommended data visualizations without the first and second subset.

8. The method of claim 1, wherein the complexity score of the organization is further calculated based on a classification of the organization based on one or more functions.

9. A non-transitory computer readable storage medium storing one or more programs, the one or more programs comprising instructions that, when executed by a computer system in communication with a display, cause the computer system to:
for a selected user of a plurality of users stored in association with an organization of a plurality of organizations, display one or more recommended data visualizations that are generated using a recommendation model and a baseline model, wherein:
the baseline model is trained based on usage of data visualizations by users other than the plurality of users stored in association with the organization; and
the recommendation model corresponds to the baseline model additionally trained based on (i) usage of data visualizations by a selected user and (ii) a complexity score of the organization calculated based on at least a respective number of the plurality of users associated with the organization and data visualizations stored in association with the organization, wherein the recommendation model further comprises:
one or more first sub-models that generate the one or more recommended data visualizations based on a first popularity score of the one or more recommended data visualizations among the plurality of users stored in association with the organization and among the users other than the plurality of users stored in association with the organization;
one or more second sub-models that generate the one or more recommended data visualizations based on a second popularity score of the one or more recommended data visualizations among users having a role that corresponds to a same role of the selected user; and
one or more weight values applied to the one or more first and second sub-models, wherein the one or more weight values determine how the one or more first and second sub-models are used to determine the one or more recommended data visualizations.

10. The non-transitory computer readable storage medium of claim 9, wherein the recommendation model corresponding to the baseline model is further trained based on usage of data visualizations by the plurality of users.

11. The non-transitory computer readable storage medium of claim 9, wherein the one or more recommended data visualizations are further selected by the recommendation model based on data visualizations explored by the selected user in a current workflow.

12. The non-transitory computer readable storage medium of claim 9, wherein the recommendation model is further trained based on a role of the selected user.

13. The non-transitory computer readable storage medium of claim 9, wherein the one or more programs include instructions that when executed by the computer system cause the computer system to:
display the one or more recommended data visualizations in a ranked order based on a confidence score.

14. The non-transitory computer readable storage medium of claim 13, wherein the confidence score is calculated based on a score provided by the selected user for respective data visualizations of the one or more recommended data visualizations, and the instructions, when executed by the computer system, further cause the computer system to:
determine one or more data visualizations available to the selected user based on access permission information associated with the selected user;
determine a first subset of the one or more data visualizations that have previously been recommended to the selected user;
determine a second subset of the one or more data visualizations that have been previously accessed by the selected user; and
display the one or more recommended data visualizations without the first subset and the second subset.

15. The non-transitory computer readable storage medium of claim 13, wherein displaying the one or more recommended data visualizations in the ranked order based on the confidence score further comprises:
determining one or more data visualization that have previously been recommended to a selected user;
determining a first subset of the one or more recommend data visualizations that have been previously accessed by the selected user; and
and second subset.

16. The non-transitory computer readable storage medium of claim 9, wherein the complexity score of the organization is further calculated based on a classification of the organization based on one or more functions and market participation by the organization.

17. A computer system comprising:
one or more processors; and
a memory storing one or more programs, wherein the one or more programs are configured to be executed by the one or more processors, the one or more programs including instructions for:
for a selected user of a plurality of users stored in association with an organization of a plurality of organizations, displaying one or more recommended data visualizations that are generated using a recommendation model and a baseline model, wherein:
the baseline model is trained based on usage of data visualizations by users other than the plurality of users stored in association with the organization; and
the recommendation model corresponds to the baseline model additionally trained based on (i) usage of data visualizations by a selected user and (ii) a complexity score of the organization calculated based on at least a respective number of the plurality of users associated with the organization and data visualizations stored in association with the organization, wherein the recommendation model further comprises:
  one or more first sub-models that generate the one or more recommended data visualizations based on a first popularity score of the one or more recommended data visualizations among the plurality of users stored in association with the organization and among the users other than the plurality of users stored in association with the organization;
  one or more second sub-models that generate the one or more recommended data visualizations based on a second popularity score of the one or more recommended data visualizations among users having a role that corresponds to a same role of the selected user; and
  one or more weight values applied to the one or more first and second sub-models, wherein the one or more weight values determine how the one or more first and second sub-models are used to determine the one or more recommended data visualizations.

18. The computer system of claim 17, wherein the recommendation model corresponding to the baseline model is further trained based on usage of data visualizations by the plurality of users.

19. The computer system of claim 17, wherein the one or more recommended data visualizations are further selected by the recommendation model based on data visualizations explored by the selected user in a current workflow.

20. The computer system of claim 17, wherein the recommendation model is further trained based on a role of the selected user.

21. The computer system of claim 17, the one or more programs including instructions for:
  displaying the one or more recommended data visualizations in a ranked order based on a confidence score.

22. The computer system of claim 21, wherein the confidence score is calculated based on a score provided by the selected user for respective data visualizations of the one or more recommended data visualizations, and the one or more programs including instructions for:
  determining one or more data visualizations available to the selected user based on access permission information associated with the selected user;
  determining a first subset of the one or more data visualizations that have previously been recommended to the selected user;
  determining a second subset of the one or more data visualizations that have been previously accessed by the selected user; and
  displaying one or more recommended data visualizations without the first subset and the second subset.

23. The computer system of claim 21, wherein the instructions for displaying the one or more recommended data visualizations in the ranked order based on the confidence score further include instructions for:
  determining one or more data visualization that have previously been recommended to a selected user;
  determining a first subset of the one or more recommend data visualizations that have been previously accessed by the selected user; and
  displaying the one or more recommended data visualizations without the first and second subset.

24. The computer system of claim 17, wherein the complexity score of the organization is further calculated based on a classification of the organization based on one or more functions and market participation by the organization.

* * * * *